United States Patent [19]

Suzuki et al.

[11] Patent Number: 5,085,966
[45] Date of Patent: Feb. 4, 1992

[54] NON-AQUEOUS DISPERSING AGENT AND LIQUID DEVELOPING AGENT FOR ELECTROSTATIC PHOTOGRAPHY

[75] Inventors: Nobuo Suzuki; Yutaka Sakasai, both of Kanagawa; Eiichi Kato, Shizuoka, all of Japan

[73] Assignee: Fuji Photo Film Co., Ltd., Kanagawa, Japan

[21] Appl. No.: 589,577

[22] Filed: Sep. 28, 1990

[30] Foreign Application Priority Data

Sep. 28, 1989 [JP] Japan ................................ 1-253252
Aug. 2, 1990 [JP] Japan ................................ 2-205373

[51] Int. Cl.$^5$ ............................................. G03G 9/135
[52] U.S. Cl. ..................................... 430/115; 430/114
[58] Field of Search ................................ 430/114, 115

[56] References Cited

U.S. PATENT DOCUMENTS 4,618,557 10/1986 Dau et al. ............................ 430/114
4,840,865 6/1989 Kato et al. ...................... 430/115 X
4,983,486 1/1991 Kato et al. ........................ 430/115

FOREIGN PATENT DOCUMENTS 366492  5/1990  European Pat. Off. ............ 430/115
43757   3/1986  Japan ................................. 430/114
151661  7/1986  Japan ................................. 430/114
231265 10/1987  Japan ................................. 430/114
74956   3/1990  Japan ................................. 430/115

Primary Examiner—Roland Martin
Attorney, Agent, or Firm—Sughrue, Mion, Zinn, Macpeak & Seas

[57] ABSTRACT

A non-aqueous dispersing agent comprising a graft copolymer is characterized in that monomer(s) to constitute the graft portion(s) of the graft copolymer is (are) at least one or more macromonomers each having a terminal polymerizable functional group and that the graft copolymer is substantially soluble in a high electric-resistance non-aqueous solvent having a dielectric constant of 3 or less and a volume specific resistance of $10^9$ Ωcm of more. The dispersing agent may sufficiently disperse any of a colorant of pigment or dye, a fixing resin-coated colorant or a fixing resin itself by wet-dispersion, and it has an excellent storage stability. The agent is therefore useful in a liquid developer for electrostatic photography or in a liquid developer for preparing printing plates.

4 Claims, No Drawings

NON-AQUEOUS DISPERSING AGENT AND LIQUID DEVELOPING AGENT FOR ELECTROSTATIC PHOTOGRAPHY

FIELD OF THE INVENTION

The present invention relates to a dispersing agent which can be used in a liquid developing agent for electrostatic photography, a printing ink and a coating composition, as well as to a liquid developing agent for electrostatic photography containing the dispersing agent and having an improved dispersing characteristic.

BACKGROUND OF THE INVENTION

In a liquid developing agent for electrostatic photography, a printing ink and a coating composition, it is required that a pigment or dye, or a colorant as formed by coating a pigment or dye with a fixing resin, or a fixing resin is stably dispersed in the form of fine grains. In a liquid developing agent for electrostatic photography, in particular, since a colorant which is dispersed in a high electric-resistance non-aqueous solvent and which is called a toner controls the image quality of the image as developed, the toner is required to have a good dispersing property.

In an electrostatic photographic process, in general, the means of developing a formed electrostatic latent image to the corresponding visible image includes a dry development method and a liquid development method. The latter liquid development method is superior to the former dry development method, since the toner grains may be finer and therefore fine images and halftone images may be faithfully reproduced.

In general, a liquid developing agent for electrostatic photography comprises a colorant such as various pigments or dyes, typically carbon black, a coating agent to adsorb onto the colorant or to coat the same so as to adjust the charge of the colorant or to impart a fixing property thereto, a dispersing agent to impart a dispersing property to the toner grains, a charge-adjusting agent to adjust the polarity of the toner grains and the amount of the charge thereof, and a high electric-resistance non-aqueous solvent carrier liquid having a dielectric constant of 3 or less and a volume specific resistance of $10^9$ $\Omega$cm or more. Pigments and dyes are unnecessary in a printing plate or the like where the toner image is required to have only an inkadhesive property and in the case where only a resist property to an etching solution is required in processing a printing plate. A liquid developing agent, a printing ink and a coating composition are generally prepared, for example, by the methods mentioned below. A pigment or dye, a fixing resin, or a pigment or dye as coated with a fixing resin is directly, or after being dry-powdered, dispersed along with a dispersing agent-containing high electric-resistance non-aqueous solvent, by the use of a wet dispersing machine such as a ball mill, paint shaker or sand mill, to a desired grain size to obtain a thick dispersion. The thus obtained thick dispersion may be used directly or after dilution with a solvent. In the case of a liquid developing agent, the thick dispersion is added to a charge-adjusting agent-containing carrier liquid to give a liquid developing agent having either a positive or negative polarity.

As described above, a non-aqueous dispersing agent for wet dispersion in the present invention means a composition which is used to finely disperse a pigment or dye in a non-aqueous solvent by a wet-dispersing machine such as a ball mill, a paint shaker and a sand mill.

As the dispersing agent for use in a non-aqueous liquid, hereafter referred to as the non-aqueous dispersing agent, to be used therein, there are generally mentioned fats and oils which are soluble in a carrier liquid; long-chain carboxylic acids such as oleic acid; oil-modified alkyd resins; esters of abietic acid; as well as homopolymers of long-chain alkyl acrylates or methacrylates such as 2-ethylhexyl (meth)acrylate or stearyl (meth)acrylate or random copolymers of such (meth)acrylates with styrene or vinyl toluene or with methyl (meth)acrylate or ethyl (meth)acrylate.

However, such conventional dispersing agents could attain a dispersing property and a dispersion stability after dispersion to some degree when a pigment or dye is dispersed singly with the agent, but they display an extremely lowered dispersing property when a colorant of a pigment or dye as coated with a fixing resin or a fixing resin itself is dispersed with the agent. As the case may be, the resin of the dispersing agent and the resin of the coating agent would often be combined and bonded to each other to form a coagulated product or a solid mass. On the other hand, a liquid developing agent to be used in preparing a printing plate by dissolving the non-image portions with an etching solution is required to have a resist-resisting property and therefore a hardly dispersible fixing resin is generally used in the liquid developing agent. However, the hardly dispersible fixing resin cannot be dispersed with the above-mentioned conventional dispersing agents.

JP-B-59-37826 (the term "JP-B" as used herein means an "examined Japanese patent publication") mentions that a morpholino group-having vinyl copolymer is useful as a dispersing agent for a liquid developing agent for electrostatic photography. However, the proposed copolymer is suitable only for dispersion of pigments. The dispersing effect of the copolymer is insufficient for dispersing fixing resin-coated pigments. JP-A-60-10263 (the term "JP-A" as used herein means an "unexamined published Japanese patent application") mentions that a block copolymer comprising styrene and a long-chain alkyl methacrylate is useful as a dispersing agent for pigments. However, it only mentions the dispersing effect of the block copolymer of dispersed pigments alone, as the illustrated block copolymer itself is to have a fixing property. Therefore, it is not clarified in the patent application as to whether or not the block copolymer has an effect of dispersing fixing resin-coated pigments. Additionally, production of the illustrated block copolymer is complicated. JP-A-57-128350 illustrates a graft copolymer composed of a soluble vinyl copolymer moiety and an insoluble vinyl copolymer moiety as grafted via a urethane bond. However, the graft copolymer is disclosed to be useful only as a dispersing agent for pigments or dyes alone. The patent application is silent on the dispersing effect, if any, of the graft copolymer for dispersing a fixing resin-coated colorant.

JP-B-56-10619 and JP-B-60-18985 illustrate liquid developing agents which contain a graft copolymer as obtained by copolymerizing a vinyl monomer and a graft-active point-imparting glycidyl methacrylate to give a stem polymer, esterifying the stem polymer with acrylic acid and then further copolymerizing the thus esterified stem polymer with other vinyl monomer. The graft copolymers as illustrated therein act as toner grains by themselves, and they are mentioned therein to be used along with a pigment to further display a dispersing activity for dispersing the pigment.

JP-B-52-3306 and JP-B-57-12985 illustrate graft copolymers to be obtained by esterifying a copolymer of a vinyl monomer and a glycidyl methacrylate with an unsaturated carboxylic acid and then further copolymerizing the esterified copolymer with one or more vinyl monomers. These patent applications mention that the graft copolymers have a dispersing effect of dispersing pigments but are almost silent on the dispersing effect, if any, of the copolymers of dispersing fixing resin-coated colorants or fixing resins themselves. Additionally, it is known that the graft copolymers thus obtained are often difficult to control, i.e., to prevent crosslinking among themselves to form a gel (JP-B-1-24302, JP-A-58-150970). Further, it is also known that the homopolymers formed often dissolve out into a carrier liquid during storage to thereby lower the dispersion stability and the charge stability (JP-A-59-34540).

In general, graft copolymers are prepared by first polymerizing a stem moiety into which plural graft-active points have been introduced in the molecule, then bonding moieties to be grafts to the active points of the stem moiety and thereafter polymerizing the graft moieties. Since the reaction of forming such graft copolymers is complicated, there are various problems such as control of polymerization is difficult, crosslinking often occurs during the reaction to form gels, homopolymers of the stem moieties are formed and the reproducibility of the reaction is poor. Additionally, it is also known that introduction of a larger amount of graft-active points cause rather noticeable gelling. This is considered to occur because, since a prepolymer into which plural graft-active points have been introduced is a so-called polyfunctional monomer having plural polymerizable positions in one molecule, it is easily gelled by crosslinking reaction. If such graft copolymers are used as a dispersing agent, the reproducibility of dispersion is, as a result, poor because of the above-mentioned problems.

In addition to the above-mentioned substances, a styrene/butadiene copolymer is also known as a dispersing agent. However, a dispersion obtained by the use of the copolymer as a dispersing agent often gives a gelled product after storage for a long period of time because of the double bonds remaining in the butadiene moieties.

Thus, at present, satisfactory techniques of overcoming the above-mentioned problems regarding production of useful dispersing agents which may disperse a pigment as well as a dye, or a colorant as coated with a fixing resin, or a fixing resin itself by a wet-dispersing method to give a complete dispersion which is free from the above-mentioned problems are unknown.

SUMMARY OF THE INVENTION

The first object of the present invention is to provide a non-aqueous dispersing agent which may well disperse any of a pigment or dye, or a fixing resin-coated pigment or dye, or a fixing resin by a wet-dispersing method.

The second object of the present invention is to provide a graft copolymer for dispersion, which may be produced by a simple reaction with little production of side products such as gels or homopolymers.

The third object of the present invention is to provide a liquid developing agent for electrostatic photography containing the above-mentioned dispersing agent and having an improved dispersing characteristic.

The fourth object of the present invention is to provide a liquid developing agent for forming printing plates, which has an excellent resist property to an etching solution and has an improved dispersing characteristic.

The fifth object of the present invention is to provide a liquid developing agent for electrostatic photography, which has a good redispersing property and an improved storage stability and which has a good image reproducibility.

In accordance with the present invention, the above-mentioned objects have been attained by providing a non-aqueous dispersing agent comprising a graft copolymer in which the monomers constituting the graft moieties are macromonomers.

More specifically, there is provided in accordance with the present invention, a non-aqueous dispersing agent comprising a graft copolymer, which is characterized in that the monomer(s) to constitute the graft portion(s) of the graft copolymer is(are) at least one or more macromonomers each having a terminal polymerizable functional group(s) and that the graft copolymer is substantially soluble in a high electricresistance non-aqueous solvent having a dielectric constant of 3 or less and a volume specific resistance of $10^9$ Ωcm of more.

As one embodiment, the non-aqueous dispersing agent comprises a graft copolymer comprising (1) at least a mono-functional macromonomer (M) having a weight average molecular weight of from $1 \times 10^3$ to $4 \times 10^4$ and (2) at least a monomer represented by formula (III), said mono-functional macromonomer (M) having a polymerizable double bond group represented by formula (I) bonded to only one terminal of a polymer main chain containing at least one kind of a polymer component represented by formula (IIa) or (IIb);

wherein V represents

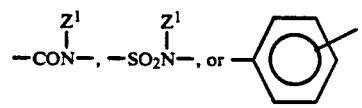

(wherein $Z^1$ represents a hydrogen atom or a hydrocarbon group and l represents an integer of from 1 to 3); $a^1$ and $a^2$, which may be the same or different, each represents a hydrogen atom, a halogen atom, a cyano group, a hydrocarbon group, $-COO-Z^2$, or $-COO-Z^2$ bonded via a hydrocarbon group (wherein $Z^2$ represents a hydrogen atom or a hydrocarbon group which may be substituted);

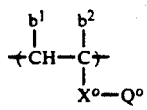 (IIa)

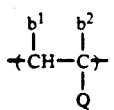 (IIb)

wherein $X^0$ has the same meaning as V in formula (I); $Q^0$ represents an aliphatic group having from 1 to 22 carbon atoms or an aromatic group having from 6 to 12; Q represents

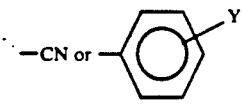

wherein Y represents a atom, a halogen atom, an alkoxy group, or $-COOZ^3$ (wherein $Z^3$ represents an alkyl group, an aralkyl group, or an aryl group); and $b^1$ and $b^2$, which may be the same or different, have the same meanings as $a^1$ and $a^2$ in formula (I);

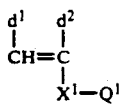 (III)

wherein $X^1$ has the same meaning as $X^0$ in formula (IIa); $Q^1$ has the same meaning as $Q^0$ in formula (IIa); and $d^1$ and $d^2$, which may be the same or different, have the same meanings as $a^1$ and $a^2$ in formula (I); with the proviso that, in the component of the macromonomer (M) represented by formula (IIa) and in the component of the monomer represented by formula (III), at least one of $Q^0$ and $Q^1$ represents an aliphatic group having from 8 to 22 carbon atoms.

As another embodiment, the graft copolymer comprises a polar group selected from $-PO_3H_2$, $-SO_3H$, $-COOH$, $-OH$,

$-P-Z^0$ (wherein $Z^0$ represents $-Z^{10}$ or $-OZ^{10}$ (wherein $Z^{10}$ represents a hydrocarbon group)), a formyl group, and an amino group at one terminal of a polymer main chain.

DETAILED DESCRIPTION OF THE INVENTION

As a function necessary for the dispersing agent of the present invention, it is important that the agent has both a component able to adsorb to a substance to be dispersed (which includes colorant grains, fixing resin-coated colorant grains and fixing resin grains, in which the dispersion thereof is referred to as dispersion, and in particular it referred to as a toner grain in a case of a liquid developing agent) as an anchor and a component which is compatible with a solvent to cause solvation. Regarding the molecular structure of the polymer of the dispersing agent, it is desired that the polymer has both a solvent-insoluble component and a solvent-soluble component in one polymer molecule.

A random copolymer having components each having a different property may easily be obtained by copolymerization of monomers of two different kinds.

However, if two different kinds of monomers are merely random-copolymerized, the resulting copolymer could disperse a colorant of pigment or dye alone as fine grains to give a fine dispersion, but it could not disperse a fixing resin-coated colorant or a fixing resin itself as fine grains.

It is considered that since a random copolymer contains a component capable of adsorbing to toner grains and a component capable of solvating with a solvent at random in one molecule, the dispersing agent containing such as random copolymer would adsorb on plural toner grains as spreading thereover to thereby cause aggregation of the toner grains to interfere with the dispersing action, and additionally, since the layer to be formed on the toner grains by the adsorbed polymer is thin, the stabilization effect to the intergranular aggregation would be insufficient.

As opposed to this, the dispersing agent of the present invention is comprised of a graft copolymer and a block copolymer each having a component capable of adsorbing to toner grains and a component capable of solvating with a solvent regularly arranged in one molecule. Accordingly, it is considered that the thickness of the layer to be formed on the toner grains by the adsorbed polymer is large and therefore the polymer may display an excellent dispersing action because of the stabilization based on the steric effect and the thermodynamical stability based on the solvation.

The dispersing agent for use in this invention is a graft copolymer obtained by polymerizing a solution containing at least the mono-fuctional macromonomer (M) and the monomer shown by formula (III) described above and has a feature that the copolymer is soluble in the aforesaid non-aqueous solvent. It is preferred in this invention that the aforesaid graft copolymer has the specific polar group as described above bonded to one terminal of the polymer main chain of the graft copolymer.

The method to obtain the graft copolymer in the present invention is called a macromonomer method.

The weight average molecular weight of the graft copolymer is suitably from $1 \times 10^4$ to $5 \times 10^5$, and preferably from $2 \times 10^4$ to $2 \times 10^5$. If the weight average molecular weight thereof is less than $1 \times 10^4$ or more than $5 \times 10^5$, the grain size of the dispersion becomes coarse or the distribution of the grain sizes become broad to reduce the dispersibility of the resin grains. In general, when the molecular weight is too low, the reduction of the dispersibility causes coarse grains and aggregation of the resin grain without providing fine dispersion. When the molecular weight is too high, solubility of the dispersion to the non-aqueous solution becomes low, sometimes, the dispersion does not become substantially soluble in the non-aqueous solution. In above molecular weight range, these disadvantages hardly happen.

The graft copolymer of the present invention is substantially soluble in a carrier liquid, which includes any case that the copolymer is dissolved in a carrier liquid to form a completely transparent solution, that the copolymer is uniformly dissolved in a carrier liquid though forming a semi-transparent solution, and that the copolymer is dissolved or dispersed in a carrier liquid to give a uniform solution or dispersion as a swollen or cloudy state and the resulting solution or dispersion shows a substantially uniform liquid state.

It is considered that the reason why the solution or dispersion of the graft copolymer in a carrier liquid is cloudy is because the graft copolymer is composed of two or more monomer components each having a different solubility and the respective components constituting the stem and graft moieties in the copolymer to show an amphiphilic property. Because of such amphiphilic property, the copolymer forms micelles with a carrier liquid to form a cloudy solution or dispersion. (Micelles are a so-called aggregate of the copolymers which are so arranged that the moieties having a lower solubility to the carrier liquid face to the inside and the moieties having a higher solubility thereto face to the outside.)

The proportion of the mono-functional macromonomer (M) as a copolymer component of the graft copolymer is from 1% by weight to 90% by weight, and preferably from 3% by weight to 70% by weight based on the weight of the copolymer. If the proportion thereof is less than 1% by weight, the number of graft portions is greatly reduced to form a chemical structure as a polymer consisting of one component, whereby the improvement of the re-dispersibility contemplated in the present invention is not obtained. On the other hand, if the proportion exceeds 90% by weight, the copolymerization with the monomer shown by formula (III) becomes insufficient. Also, the content of the monomer shown by formula (III) existing in the aforesaid graft copolymer as other copolymer component is from 10% by weight to 99% by weight, and preferably from 30% by weight to 97% by weight.

On the other hand, the weight average molecular weight of the macromonomer (M) which forms the graft portion of the graft copolymer in this invention is from $1 \times 10^3$ to $4 \times 10^4$, and preferably from $2 \times 10^3$ to $3 \times 10^4$. If the weight average molecular weight thereof is less than $1 \times 10^3$, the re-dispersibility of the dispersion resin grains obtained is lowered. On the other hand, if the weight average molecular weight exceeds $4 \times 10^4$, the copolymerizing property with the monomer shown by formula (III) is generally lowered, whereby a graft copolymer is not formed.

Since the graft copolymer in this invention is required to be soluble in the aforesaid non-aqueous solvent, the copolymer must contain solubilizing recurring unit(s) at the polymer chain portion and/or the graft portion thereof. For this purpose, at least one of $Q^0$ and $Q^1$ in the component of macromonomer (M) represented by formulae (IIa) and in the component of the monomer represented by formula (III), respectively, must be an aliphatic group having from 8 to 22 carbon atoms as described before as one of the features of the present invention.

That is, when the macromonomer (M) constituting the graft portion of the graft copolymer contains the recurring unit shown by formula (IIa) and $Q^0$ in formula (IIa) is an aliphatic group having less than 8 carbon atoms or an aromatic group, or, when the macromonomer (M) contains the recurring unit shown by formula (IIb), $Q^1$ in formula (III) constituting the main chain portion of polymer represents an aliphatic group having from 8 to 22 carbon atoms. Also, when $Q^1$ in formula (III) is an aliphatic group having less than 8 carbon atoms or an aromatic group, the macromonomer (M) being combined with the monomer shown by the formula (III) contains at least the recurring unit shown by formula (IIa) wherein $Q^0$ is an aliphatic group having from 8 to 22 carbon atoms.

Then, the graft copolymer for use in this invention is described hereinafter in more detail.

The mono-functional macromonomer (M) is a macromonomer having a weight average molecular weight of from $1 \times 10^3$ to $4 \times 10^4$ and comprising the recurring unit shown by formula (IIa) or (IIb) having the polymerizable double bond group shown by formula (I) copolymerizable with the monomer shown by (III), and the polymerizable double bond group is bonded to only one terminal of the main chain of the polymer composed of the aforesaid recurring unit.

In formulae (I), (IIa), and (IIb) described above, the hydrocarbon groups shown by $a^1$, $a^2$, V, $b^1$, $b^2$, $X^0$, $Q^0$, and Q each has the carbon atom number indicated above (as an unsubstituted hydrocarbon group) and each hydrocarbon group may be substituted.

In formula (I), $Z^1$ in the groups (substituents) shown by V represents a hydrogen atom or a hydrocarbon group, and preferred examples of the hydrocarbon group include an alkyl group having from 1 to 22 carbon atoms, which may be substituted (e.g., methyl, ethyl, propyl, butyl, heptyl, hexyl, octyl, decyl, dodecyl, tridecyl, tetradecyl, hexadecyl, octadecyl, 2-chloroethyl, 2-bromoethyl, 2-cyanoethyl, 2-methoxycarbonylethyl, 2-methoxyethyl, and 2-bromopropyl), an alkenyl group having from 4 to 18 carbon atoms, which may be substituted (e.g., 2-methyl-1-propenyl, 2-butenyl, 2-pentenyl, 3-methyl-2-pentenyl, 1-pentenyl, 1-hexenyl, 2-hexenyl, and 4-methyl-2-hexenyl), an aralkyl group having from 7 to 12 carbon atoms, which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl), an aliphatic group having from 5 to 8 carbon atoms, which may be substituted (e.g., cyclohexyl, 2-cyclohexylethyl, and 2-cyclopentylethyl), and an aromatic group having from 6 to 12 carbon atoms, which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, and dodecyloylamidophenyl) and a group having a cross-linking hydrocarbon (e.g., bicyclo(1,1,0)butane, bicyclo(3,2,1)octane, bicyclo(5,2,0)-nonane, bicyclo(4,3,2)undecane, adamantane).

When V in formula (I) represents

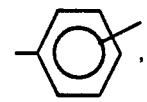

the benzene ring may have a substituent such as a halogen atom (e.g., chlorine and bromine), an alkyl group (e.g., methyl, ethyl, propyl, butyl, chloromethyl, and methoxymethyl), etc.

In formula (I), $a^1$ and $a^2$, which may be the same or different, each represents preferably a hydrogen atom, a halogen atom (e.g., chlorine and bromine), a cyano group, an alkyl group having from 1 to 3 carbon atoms (e.g., methyl, ethyl, and propyl), —COO—$Z^2$ or —CH$_2$COO$Z^2$ (wherein $Z^2$ represents preferably a hydrogen atom, an alkyl group having from 1 to 18 carbon atoms, an alkenyl group, an aralkyl group, an alicyclic group, or an aryl group, each group may be substituted, and specific examples of $Z^2$ are the same as those described above for $Z^1$).

In formulae (IIa) and (IIb), $X^0$ has the same meaning as V in formula (I), and $b^1$ and $b^2$, which may be the same or different, have the same meaning as $a^1$ and $a^2$ in formula (I).

$Q^0$ in formula (IIa) represents preferably an aliphatic group having from 1 to 22 carbon atoms and specific examples thereof are the same as the alkyl groups described above for $Z^1$.

When Y included in Q in formula (IIa) is an alkoxy group, specific examples of the alkyl moiety thereof are the same as those in $Q^0$ described above.

The preferred embodiments of $X^0$, $b^1$, and $b^2$ are the same as those described above on V, $a^1$ and $a^2$.

It is more preferred that one of $a^1$ and $a^2$ in formula (I) or one of $b^1$ and $b^2$ in formula (IIa) or (IIb) is a hydrogen atom.

The recurring unit of the macromonomer (M) in this invention includes at least one kind of the recurring unit shown by formula (IIa) or (IIb) and specific examples thereof are illustrated below although the present invention is not limited thereto.

In the following formulae, $Q_a$ represents —$C_pH_{2p+}$ (wherein p represents an integer of from 1 to 18) or

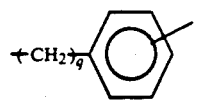

(wherein q represents an integer of from 1 to 4); b represents —H or —$CH_3$; l represents an integer of from 2 to 12; and $R_1$ represents —H or —$CrH_{2r+1}$ (wherein r represents an integer of from 1 to 8).

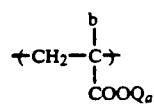  (A)-1

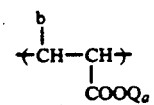  (A)-2

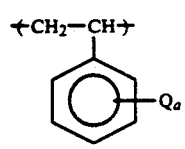  (A)-3

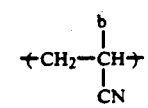  (A)-4

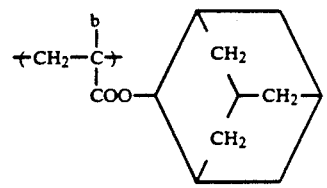  (A)-5

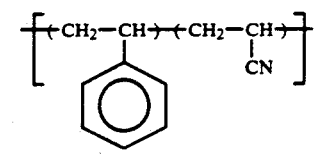  (A)-6

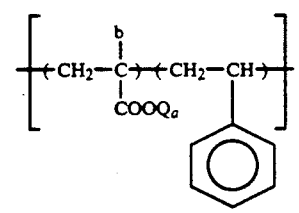  (A)-7

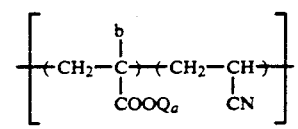  (A)-8

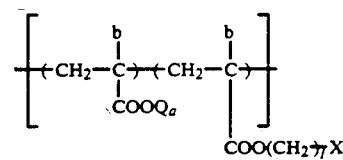  (A)-9

X: —OH, —$OR_b$ ($R_b$: —$C_rH_{2r+1}$), —F, —Cl, Br, or —CN

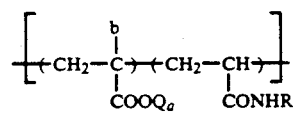  (A)-10

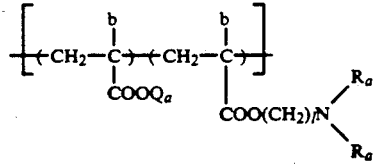  (A)-11

The macromonomer (M) which is used in this invention has a chemical structure that the polymerizable double bond group shown by formula (I) is bonded directly or by an optional linkage group to only one terminal of the polymer main chain composed of at least one kind of the recurring unit shown by formula (IIa) or (IIb) as described above.

The linkage group of linking the component shown by formula (I) to the component shown by formula (IIa) or (IIb) is composed of an optional combination of an atomic group such as carbon-carbon bond (single bond or double bond), a carbon-hetero-atom bond (examples of the hetero atom are oxygen, sulfur, nitrogen, and silicon), and a hetero atom-hetero atom bond.

Preferred examples of the macromonomer (M) in this invention are shown by formula (V);

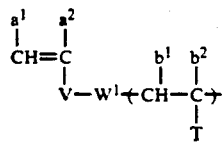

wherein $a^1$, $a^2$, $b^1$, $b^2$, and V have the same meanings as those described above in formulae (I), (IIa) and (IIb).

T represents $-X^0-Q^0$ in formula (IIa) or $-Q$ in formula (IIb) and has the same meaning as described above in formulae (IIa) and (IIb).

In formula (IV), $W^1$ represents a single bond or a single linkage group selected from the atomic groups of

(wherein $Z^4$ and $Z^5$ each represents a hydrogen atom, a halogen atom (e.g., fluorine, chlorine, and bromine), a lower alkyl group (e.g., methyl, propyl), a cyano group, a hydroxy group)

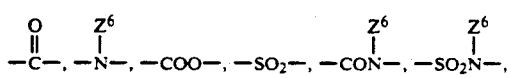

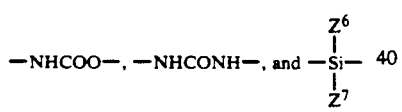

(wherein $Z^6$ and $Z^7$ each represents a hydrogen atom or the same hydrocarbon group as $Z^1$ described above) or a linkage group composed of an optional combination of the aforesaid atomic groups.

Particularly preferred examples of $X^0$, Y, V, $a^1$, $a^2$, $b^1$, and $b^2$ in aforesaid formulae (I), (IIa), (IIb) and (V) are shown below.

That is, $X^0$ is preferably —COO—, —OCO—, —O—, —CH$_2$COO— or —CH$_2$OCO—, Y is preferably an alkyl or alkenyl group having not more than 18 carbon atoms; V represents any of the above described groups ($Z^1$ is, however, a hydrogen atom); and $a^1$, $a^2$, $b^1$, and $b^2$ are preferably a hydrogen atom or a methyl group.

Specific examples of the group shown by

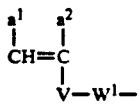

in formula (V) are illustrated below but the scope of this invention is not limited thereto.

In the following formulae, $m_1$ represents an integer of from 1 to 12; $n_1$ represents an integer of from 2 to 12; and a represents H or —CH$_3$.

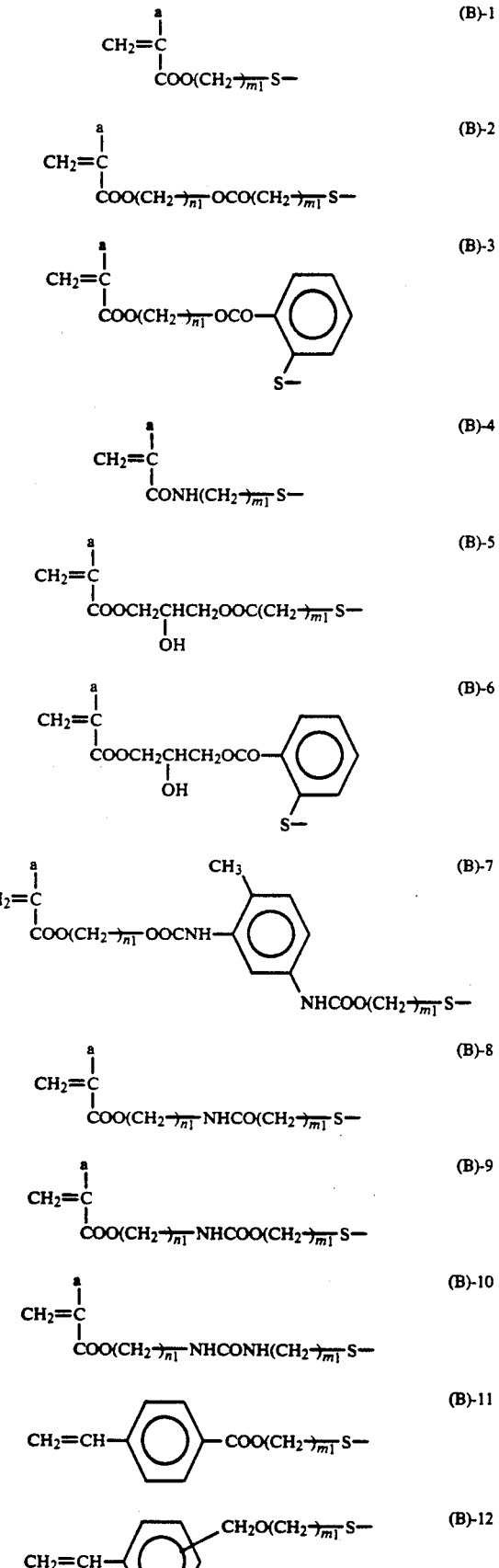

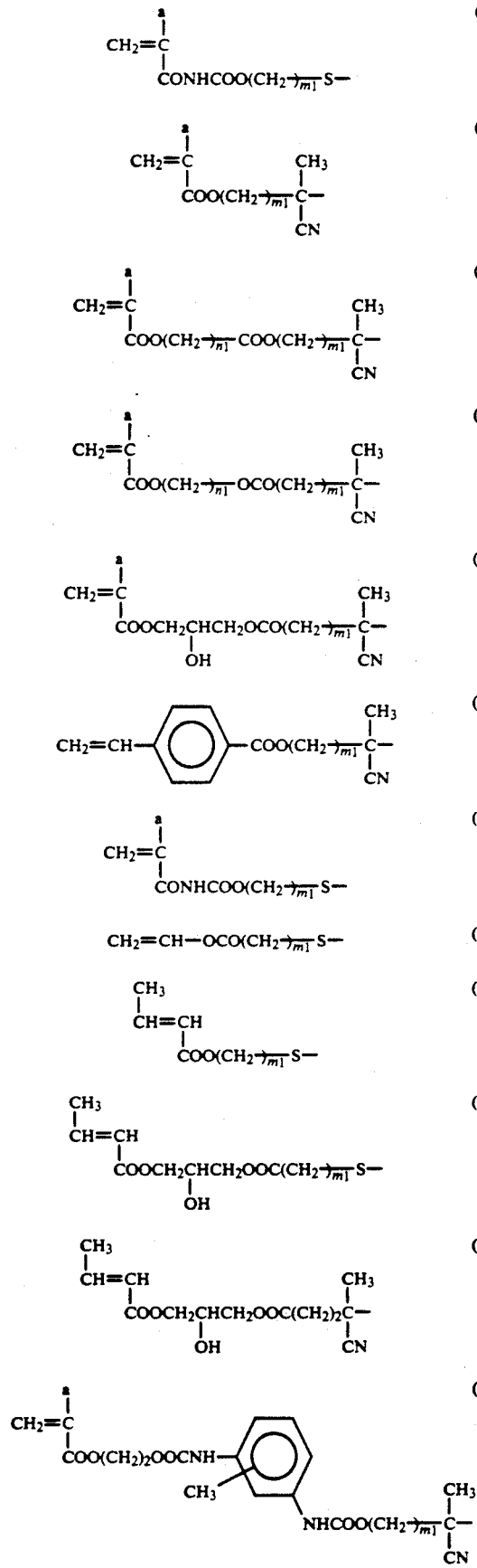
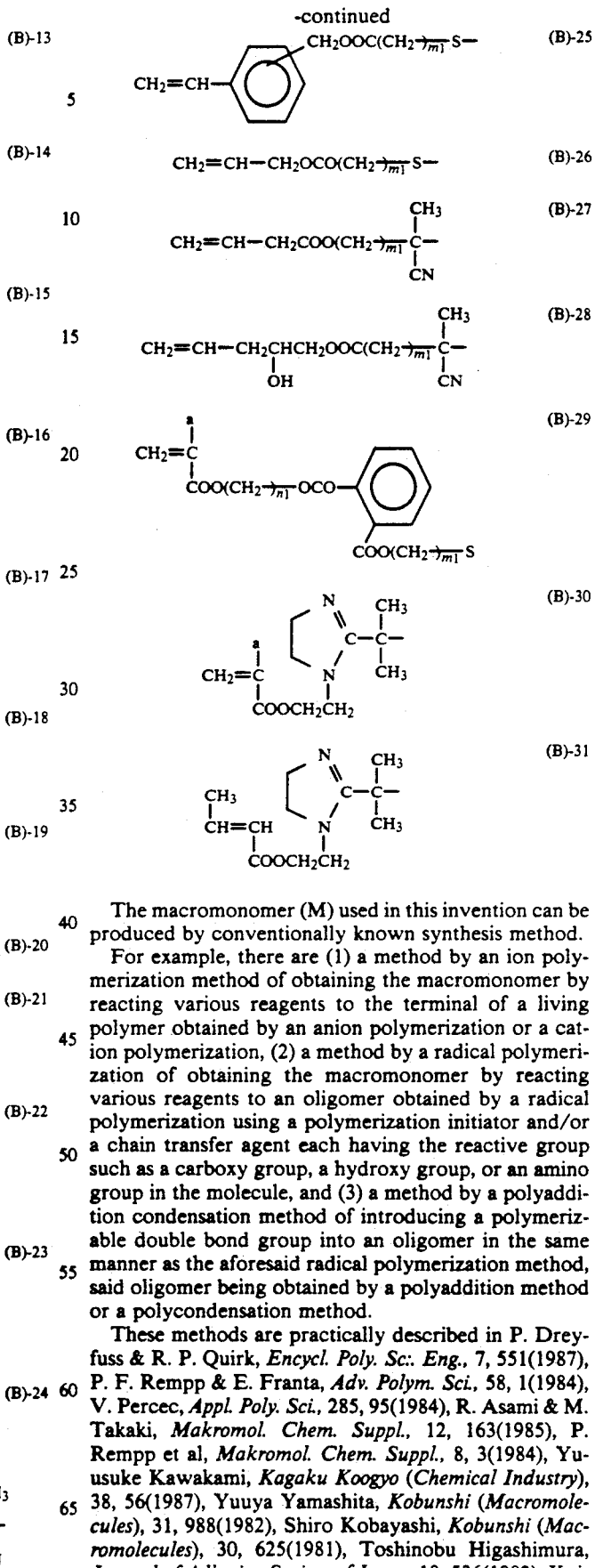

The macromonomer (M) used in this invention can be produced by conventionally known synthesis method.

For example, there are (1) a method by an ion polymerization method of obtaining the macromonomer by reacting various reagents to the terminal of a living polymer obtained by an anion polymerization or a cation polymerization, (2) a method by a radical polymerization of obtaining the macromonomer by reacting various reagents to an oligomer obtained by a radical polymerization using a polymerization initiator and/or a chain transfer agent each having the reactive group such as a carboxy group, a hydroxy group, or an amino group in the molecule, and (3) a method by a polyaddition condensation method of introducing a polymerizable double bond group into an oligomer in the same manner as the aforesaid radical polymerization method, said oligomer being obtained by a polyaddition method or a polycondensation method.

These methods are practically described in P. Dreyfuss & R. P. Quirk, *Encycl. Poly. Sc:. Eng.*, 7, 551(1987), P. F. Rempp & E. Franta, *Adv. Polym. Sci.*, 58, 1(1984), V. Percec, *Appl. Poly. Sci.*, 285, 95(1984), R. Asami & M. Takaki, *Makromol. Chem. Suppl.*, 12, 163(1985), P. Rempp et al, *Makromol. Chem. Suppl.*, 8, 3(1984), Yuusuke Kawakami, *Kagaku Koogyo* (Chemical Industry), 38, 56(1987), Yuuya Yamashita, *Kobunshi* (Macromolecules), 31, 988(1982), Shiro Kobayashi, *Kobunshi* (Macromolecules), 30, 625(1981), Toshinobu Higashimura, *Journal of Adhesion Society of Japan*, 18, 536(1982), Koichi Ito, *Kobunshi Kako (Macromolecule Processing)*, 35, 262(1986), and Kishiro Higashi & Takashi Tsuda, *Kinozairyo (Functional Materials)*, 1987, No. 10, 5, and the literature references and patents cited therein.

Then, the monomer shown by formula (III), which forms the graft copolymer for use in this invention as a copolymer component together with the aforesaid macromonomer (M) is described in detail.

In formula (III), $X^1$ has the same meaning as $X^0$ in formula (IIa) and represents preferably —COO—, —OCO—, —CH$_2$OCO—, —CH$_2$COO—, —O—, or

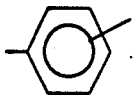

$Q^1$ is a hydrogen atom and has the same meaning as $Q^0$ in formula (IIa) and represents preferably an aliphatic group having from 1 to 22 carbon atoms. Practical examples thereof are same as the aliphatic group shown by $Z^1$ in formula (I) described above.

In formula (III), $d^1$ and $d^2$, which may be the same or different, have practically the same meaning as $a^1$ and $a^2$ in formula (I). It is preferred that one of $d^1$ and $d^2$ represents a hydrogen atom.

The graft copolymer for use in this invention may further contain monomers other than the monomer shown by formula (III) as a copolymer component, such other monomers being copolymerizable with the monomer of formula (III).

Examples of other monomers described above include acrylonitrile, methacrylonitrile, acrylamide, methacrylamide, styrene, chlorostyrene, bromostyrene, vinylnaphthalene, heterocyclic compounds having a polymerizable double bond (e.g., vinylpyridine, vinylimidazoline, vinylthiophene, vinyldioxane, and vinylpyrrolidone), unsaturated carboxylic acids (e.g., acrylic acid, methacrylic acid, itaconic acid, crotonic acid, and maleic acid), itaconic anhydride, and maleic anhydride.

These monomers other than the monomer shown by formula (III) may be copolymerizable and the content of such other monomer is preferably less than 30% by weight of the total monomer components of the graft copolymer.

Furthermore, the comb-like copolymer for use in this invention may have the specific polar group at only one terminal of the polymer main chain thereof.

That is, the polar group is selected from —PO$_3$H$_2$, —SO$_3$H, —COOH, —OH, —SH,

(wherein $Z^0$ represents —$Z^{10}$ or —O$Z^{10}$ (wherein $Z^{10}$ represents a hydrocarbon group)), a formyl group, and an amino group.

In the polar group shown by

$Z^{10}$ of $Z^0$ represents preferably a hydrocarbon group having from 1 to 18 carbon atoms, and preferred examples of the hydrocarbon group include an aliphatic group having from 1 to 8 carbon atoms, which may be substituted (e.g., methyl, ethyl, propyl, butyl, pentyl, hexyl, butenyl, pentenyl, hexenyl, 2-chloroethyl, 2-cyanoethyl, cyclopentyl, cyclohexyl, benzyl, phenethyl, chlorobenzyl, and bromobenzyl) and an aromatic group which may be substituted (e.g., phenyl, tolyl, xylyl, mesityl, chlorophenyl, bromophenyl, methoxyphenyl, and cyanophenyl).

Also, in the aforesaid polar groups, the amino group represents —NH$_2$, —NH$Z^{11}$, or

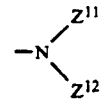

wherein $Z^{11}$ and $Z^{12}$ each represents a hydrocarbon group having from 1 to 18 carbon atoms, and preperably 1 to 8 carbon atoms. Specific examples of the hydrocarbon group for $Z^{11}$ and $Z^{12}$ are those described above for $Z^1$.

Furthermore, more preferred hydrocarbon groups represented by $Z^{10}$, $Z^{11}$, and $Z^{12}$ include an alkyl group having from 1 to 4 carbon atoms, which may be substituted, a benzyl group which may be substituted, and a phenyl group which may be substituted.

In this case, the graft copolymer has a chemical structure that the polar group is bonded to one terminal of the polymer main chain directly or via an optional linkage group. The linkage group bonding the polar group to the graft copolymer component is composed of an optional combination of atomic groups such as a carbon-carbon bond (single bond or double bond), a carbon-heterto atom bond (examples of the hetero atom are oxygen, sulfur, nitrogen and silicon), and a hetero atom-hetero atom bond.

Preferred copolymers in the comb-like copolymer having the specific polar group at one terminal of the polymer main chain for use in this invention are represented by formula (VIa) or (VIb):

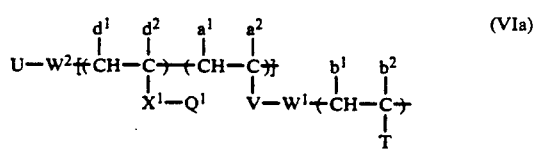

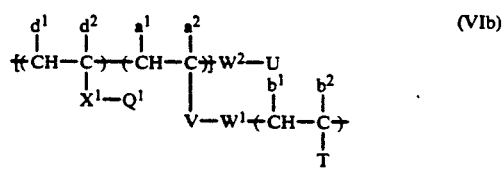

wherein $a^1$, $a^2$, $b^1$, $b^2$, $d^1$, $d^2$, $X^1$, $Q^1$, $V$, $W^1$ and $T$ are the same as those in formulae (I), (IIa) (IIb), (III), and (IV); and U represents the aforesaid polar group bonded to one terminal of the main chain of the comb-like copolymer.

In the above formulae, $W^2$ represents a chemical bond or a linkage group bonding the specific polar group U to the polymer main chain, and practically, has the same meaning as those described above for $W^1$.

In the case of the graft copolymer having the specific polar group at one terminal of the polymer main chain as described above, it is preferred that the copolymer does not contain in the polymer main chain a copolymer component having a polar group such as a phosphono group, a carboxy group, a sulfo group, a hydroxy group, a formyl group, an amino group, a mercapto group, and

(wherein $Z^0$ is the same as described above).

The graft copolymer having the specific polar group at only one terminal of the polymer main chain can be easily produced by (1) a method (a method by an ion polymerization) of reacting various reagents to one terminal of a living polymer obtained by a conventionally known anion polymerization or cation polymerization, (2) a method (a method by a radical polymerization) of performing a radical polymerization using a polymerization initiator and/or a chain transfer agent each having the specific polar group in the molecule, or (3) a method of forming a copolymer having a reactive group at one terminal thereof by the ion polymerization or radical polymerization as described above and converting the reactive group into the specific polar group by a macromolecular reaction.

Practical methods for producing the graft copolymer are described in P. Dreyfuss & R. P. Quirk, *Encycl. Polym. Sci. Eng.*, 7, 551 (1987), Yoshiki Nakajo & Yuya Yamashita, *Senryo to Yakuhin (Dyes and Chemicals)*, 30, 232 (1985), and Akira Ueda & Susumu Nagai, *Kagaku to Kogyo (Science and Industry)*, 60, 57 (1986) and the literature references cited therein.

Examples of the aforesaid polymerization initiator having the specific polar group in the molecule are 4,4'-azobis(4-cyanovaleic acid), 4,4'-azobis(4-cyanovaleric acid chloride), 2,2'-azobis(2-cyanopropanol), 2,2'-azobis(2-cyanopentanol), 2,2'-azobis[2-methyl-N-(2-hydroxyethyl)-propioamide], 2,2'-azobis{2-methyl-N-[1,1-bis(hydroxymethyl)ethyl]propioamide}, 2,2'-azobis[2-methyl-N-[1,1-bis(hydroxymethyl)-2-hydroxyethyl]propioamide}, 2,2'-azobis[2-(5-methyl-2-imidazolin-2-yl)propane], 2,2'-azobis[2-(4,5,6,7-tetrahydro-1H-1,3-diazepin-2-yl)propane], 2,2'-azobis[2-(3,4,5,6-tetrahydropyrimidin-2-yl)propane], 2,2'-azobis[2-(5 hydroxy-3,4,5,6-tetrapyrimidin-2-yl)propane] 2,2'-azobis{2-[1-(2-hydroxyethyl)-2-imidazolin-2-yl]propane}, 2,2'-azobis[N-(2-hydroxyethyl)-2-methylpropionamidine], and 2,2'-azobis[N-(4-aminophenyl)-2-methylpropionamidine].

Also, examples of the chain transfer agent having the specific polar group in the molecule are mercapto compounds having the polar group or a substituent capable of being induced into the polar group (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-metcaptoethyl)carbamoyl]propionic acid, 3-[N-(2-mercaptoethyl)amino]propionic acid, N-(3-mercaptopropionyl)aranine, 2-mercaptoethanesulfonic acid, 3-mercaptopropanesulfonic acid, 4-mercaptobutanesulfonic acid, 2-mercaptoethanol, 3-mercapto-1,2-prpoanediol, 1-mercapto-2-propanol, 3,-mercapto-2-butanol, mercaptophenol, 2-mercaptoethylamine, 2-mercaptoimidazole and 2-mercapto-3-pyridinol) and iodized alkyl compounds having the polar group or a substituent capable of being converted into the polar group (e.g., iodoacetic acid, iodopropionic acid, 2-iodoethanol, 2-iodoethanesulfonic acid, and 3-iodopropanesulfonic acid). The mercapto compounds are preferred in this invention.

The content of the chain transfer agent or the polymerization initiator of from 0.1 to 10 parts by weight, and preferably from 0.5 to 5 parts by weight based on 100 parts of the total monomers.

The preferred graft copolymers having the polar group at one terminal of the main chain of the copolymer are shown by aforesaid formula (VIa) or (VIb) and the moiety shown by $U-W^2-$ in these formulae are practically illustrated below. However, it is to be noted that the scope of this invention is not limited to these specific examples.

In the following formulae, $k_1$ represents 1 or 2; $k_2$ represents an integer of from 2 to 16; and $k_3$ represents an integer of from 1 to 3.

 (C)-1

 (C)-2

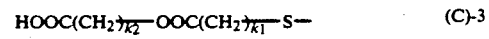 (C)-3

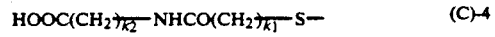 (C)-4

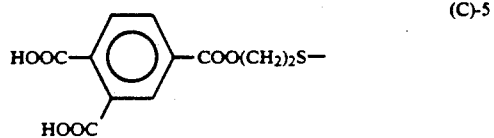 (C)-5

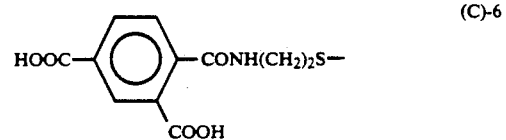 (C)-6

 (C)-7

 (C)-8

 (C)-9

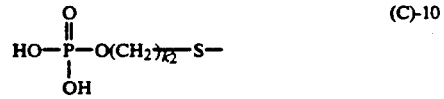 (C)-10

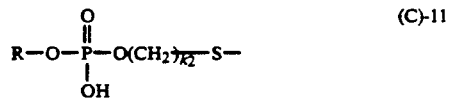 (C)-11

R: an alkyl group of 1 to 6 carbon atoms

 (C)-12

(C)-13

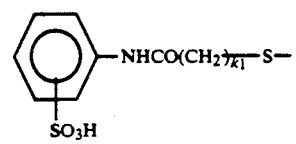

-continued (C)-14

$\mathrm{C_6H_4(OOC(CH_2)_{k1}S-)(SO_3H)}$ (C)-15 phthalic anhydride with $\mathrm{-COO(CH_2)_{k2}S-}$ (C)-16 phthalic anhydride with $\mathrm{-CONH(CH_2)_2S-}$ (C)-17

$$\mathrm{HOOC+CH_2)_{k2}}\!\!-\!\!\underset{\underset{\mathrm{CN}}{|}}{\overset{\overset{\mathrm{CH_3}}{|}}{\mathrm{C}}}\!\!-$$

(C)-18

$$\mathrm{HO(CH_2)_{k3}}\!\!-\!\!\underset{\underset{\mathrm{CN}}{|}}{\overset{\overset{\mathrm{CH_3}}{|}}{\mathrm{C}}}\!\!-$$

(C)-19

$$\mathrm{HO(CH_2)_{k2}\!\!-\!\!OOC(CH_2)_{k2}}\!\!-\!\!\underset{\underset{\mathrm{CN}}{|}}{\overset{\overset{\mathrm{CH_3}}{|}}{\mathrm{C}}}\!\!-$$

(C)-20

$$\mathrm{HOOC(CH_2)_{k2}\!\!-\!\!COO(CH_2)_{k3}}\!\!-\!\!\underset{\underset{\mathrm{CN}}{|}}{\overset{\overset{\mathrm{CH_3}}{|}}{\mathrm{C}}}\!\!-$$

(C)-21 phthalic anhydride with $\mathrm{-COO(CH_2)_{k3}}\!\!-\!\!\underset{\underset{\mathrm{CN}}{|}}{\overset{\overset{\mathrm{CH_3}}{|}}{\mathrm{C}}}\!\!-$ (C)-22

$$\mathrm{HO}\!\!-\!\!\underset{\underset{\mathrm{OH}}{|}}{\overset{\overset{\mathrm{O}}{\|}}{\mathrm{P}}}\!\!-\!\!\mathrm{O(CH_2)_{k3}}\!\!-\!\!\underset{\underset{\mathrm{CN}}{|}}{\overset{\overset{\mathrm{CH_3}}{|}}{\mathrm{C}}}\!\!-$$

(C)-23

$$\mathrm{R\!-\!NHCO}\!\!-\!\!\underset{\underset{\mathrm{CH_3}}{|}}{\overset{\overset{\mathrm{CH_3}}{|}}{\mathrm{C}}}\!\!-$$

$$\mathrm{R:\ HO+CH_2)_{\overline{n}}\ ,\ H_3C}\!\!-\!\!\underset{\underset{\mathrm{CH_2OH}}{|}}{\overset{\overset{\mathrm{CH_2OH}}{|}}{\mathrm{C}}}\!\!-$$

(C)-24

$$\underset{\underset{\mathrm{R'}}{|}}{\overset{\mathrm{N}}{\underset{\mathrm{N}}{\diagdown}}}\mathrm{C}\!\!-\!\!\underset{\underset{\mathrm{CH_3}}{|}}{\overset{\overset{\mathrm{CH_3}}{|}}{\mathrm{C}}}\!\!-$$

Z; $-(\mathrm{CH_2})_3-$, $-(\mathrm{CH_2})_4-$, $-\mathrm{CH_2CH(OH)CH_2}-$

R'; $-\mathrm{H}$, $-\mathrm{CH_2CH_2OH}$ (C)-25

$$\underset{\underset{\mathrm{R''-HN}}{}}{\overset{\mathrm{HN}}{\diagdown}}\mathrm{C}\!\!-\!\!\underset{\underset{\mathrm{CH_3}}{|}}{\overset{\overset{\mathrm{CH_3}}{|}}{\mathrm{C}}}\!\!-$$

R''; $-\mathrm{CH_2CH_2OH}$, phenyl-$\mathrm{R_1}$ ($\mathrm{R_1}$; H, $-\mathrm{NH_2}$, $-\mathrm{OH}$)

(C)-26

$$\mathrm{OHC(CH_2)_{k2}}\!\!-\!\!\underset{\underset{\mathrm{CN}}{|}}{\overset{\overset{\mathrm{CH_3}}{|}}{\mathrm{C}}}\!\!-$$

(C)-27

$$\mathrm{R_2\!\!-\!\!\underset{\underset{\mathrm{OH}}{|}}{\overset{\overset{\mathrm{O}}{\|}}{\mathrm{P}}}\!\!-\!\!O(CH_2)_2S-}$$

$\mathrm{R_2}$: an alkyl group of 1 to 6 carbon atoms (C)-28

$\mathrm{C_6H_4(CONH(CH_2)_{k2}S-)(SO_3H)}$ (C)-29

$\mathrm{HOOC(CH_2)_2NH(CH_2)_{k1}S-}$ (C)-30

$\mathrm{HOOC+CH_2)_{k2}\!\!-\!\!CONH(CH_2)_{k2}S-}$

As these macromonomers having a polymerizable double bond group bonded to only one terminal of a polymer main chain, various commercial products can be employed. A polymer product which is obtained by copolymerizing these macromonomers with a monomer of formula (III) is greatly effective as a non-aqueous dispersing agent of the present invention.

For example, commercial products which may be employed in the present invention are sold by Satomer Co., Toa Gosei Chemical Industry Co., Soken Chemical Co., and Nippon Fats and Oils Co.

Next, examples of commercial macromonomers which are sold by Toa Gosei Chemical Industry Co. are mentioned below.

| Terminal Group | Segment | Molecular Weight | Trade Name |
|---|---|---|---|
| Methacryloyl Group | Styrene | 6000 | AS-6 |

-continued

| Terminal Group | Segment | Molecular Weight | Trade Name |
|---|---|---|---|
| CH₃<br>\|<br>CH₂=C<br>\|<br>COO— | Styrene/Acrylonitrile | 6000 | AN-6 |
| | Methyl Methacrylate | 6000 | AA-6 |
| | Butyl Methacrylate | 6000 | AB-6 |
| | Methyl Methacrylate | 2000 | AA-2 |

Molecular Weight: Number average molecular weight by GPC method

The segment represents a polymer portion of a macromonomer and it corresponds to a compound of formula (IIa) and formula (IIb). The terminal group corresponds to a compound of formula (I).

In accordance with the present invention, a non-aqueous solvent having an electric resistance of $1 \times 10^9$ Ωcm or more and a dielectric constant of 3 or less can be used as a carrier liquid. As examples of usable non-aqueous solvents, there are mentioned solvents of linear or branched aliphatic hydrocarbons, alicyclic hydrocarbons, aromatic hydrocarbons and halogenatedhydrocarbons. In view of the volatility, safety, environmental pollution and odor, octane, isooctane, decane, isodecane, dodecane, isododecane, nonane, as well as isoparaffin petroleum solvents of Isopar E, Isopar G, Isopar H and Isopar L (trade names by Exon Co.) and Isododecane (BP Chemical Co.), Shell Sol 71 (Shell Co.) and IP Solvent 1620 (Idemitsu Petrochemical Co.) are preferred.

As pigments and dyes for use in the present invention, various known inorganic pigments, organic pigments and dyes can be used.

For example, there are mentioned a metal powder such as an aluminium powder; metal oxides such as magnetic iron oxide, zinc oxide, titanium oxide and silicon dioxide; metal salts such as powdery lead cadmium selenium-chromate; as well as Hansa Yellow (C.I. 11680), Benzidine Yellow G (C.I. 21090), Benzidine Orange (C.I. 21110), Fast Red (C.I. 37085), Brilliant Carmine 3B (C.I. 16015), Phthalocyanine Blue (C.I. 74160), Phthalocyanine Green (C.I. 74260), Victoria Blue (C.I. 42595-Lake), Spirit Black (C.I. 50415), Oil Blue (C.I. 74350), Alkali Blue (C.I. 42770A), Fast Scarlet (C.I. 12315), Rhodamine 6B (C.I. 45160), Fast Sky Blue (C.I. 74200-Lake), Nigrosine(C.I. 50415), and carbon black. Additionally, surface treated pigments, for example, nigrosine-dyed carbon black and polymer-grafted carbon may also be employed.

As the charge-adjusting agent to be used in the liquid developing agent of the present invention, any known substances can be used. For example, usable are metal salts of fatty acids such as naphthenic acid, octenoic acid, oleic acid or stearic acid; metal salts of sulfosuccinic acid esters; oil-soluble metal salts of sulfonic acids, as described in JP-B-45-556, and JP-A-52-37435 and JP-A-52-37049; metal salts of phosphoric acid esters, as described in JP-B-45-9594; metal salts of abietic acid or hydrogenated abietic acid, as described in JP-B-48-25666; calcium salts of alkylbenzenesulfonic acids, as described in JP-B-55-2620; metal salts of aromatic carboxylic acids or sulfonic acids, as described in JP-A-52-107837, JP-A-52- 38937, JP-A-57-90643 and JP-A-57-139753; nonionic surfactants such as polyoxyethylated alkylamines; fats and oils such as lecithin and linseed oil; polyvinyl pyrrolidone; organic acid esters of polyhydric alcohols; phosphate surfactants, as described in JP-A-57-210345; and sulfonic acid resins, as described in JP-B-56-24944. Additionally, amino acid derivatives described in JP-A-60-21056 and JP-A-61-50951 may also be employed. The amino acid derivatives are compounds of the following general formula (VII) or (VIII) or reaction mixtures obtained by reacting an amino acid and a methane compound in an organic solvent to give a reaction mixture and further reacting the mixture with water.

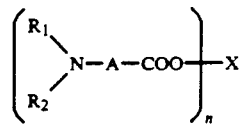

(VII)

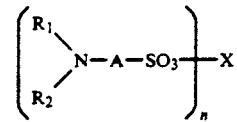

(VIII)

wherein R₁ and R₂ independently represent a hydrogen atom, an alkyl group having from 1 to 22 carbon atoms, a substituted alkyl group (as substituted by substituent(s) selected from a dialkylamino group, an alkyloxy group and an alkylthio group), an aryl group having from 6 to 24 carbon atoms, a substituted aryl group (as substituted by substituent(s) selected from a dialkylamino group, an alkyloxy group, an arylthio group, a chlorine atom, a bromine atom, a cyano group, a nitro group and a hydroxyl group), an aralkyl group, an acyl group having from 1 to 22 carbon atoms, an alkylsulfonyl group, an alkylphosphonyl group, an arylsulfonyl group having from 6 to 24 carbon atoms, or an arylphosphonyl group; R₁ and R₂ may be same or different; and R₁–R₂ may form a ring; but R₁ and R₂ must not be hydrogen atoms at the same time; A represents an alkylene or substituted alkylene group having from 1 to 10 carbon atoms; X represents a hydrogen atom, or a mono- to tetra-valent metal, or a quaternary ammonium cation; and n represents a positive integer.

Additionally, quaternated amine polymers as described in JP-A-54-31739 and JP-B-56-24994 can also be employed.

Above all, preferred are metal salts of naphthenic acid, metal salts of dioctylsulfosuccinic acid, lecithin and the above-mentioned amino acid derivatives. More preferred are zirconium, cobalt or manganese salt of naphthenic acid, calcium or sodium salt of dioctylsulfosuccinic acid, and metal salts of compounds of the above-mentioned formula (VII). As metal salts of compounds of the formula (VII), especially preferred are titanium, cobalt, zirconium or nickel salts of the compounds.

As the charge-adjusting agent, two or more kinds of the above-mentioned compounds can be employed.

As the coating agent resin to be applied to the colorant of a pigment or dye to be employed in the present invention for the purpose of imparing a fixing property thereto, various known resins which are insoluble in or swellable with a liquid carrier can be used.

For example, there are mentioned rubbers such as butadiene rubber, styrene-butadiene rubber, chlorinated rubber or natural rubber; synthetic resins such as styrene resins, vinyltoluene resins, acrylic resins, methacrylic resins, polyester resins, polycarbonates or polyvinyl acetates; rosin resins; hydrogenated rosin resins; alkyd resins including modified alkyd resins such as linseed oil-modified alkyd resin; as well as natural resins such as polyterpenes. Additionally, phenol resins including modified phenol resins such as phenol-formalin resins, as well as natural resin-modified maleic acid resins, pentaerythritol phthalate, chroman-indene resins, ester rubber resins, and vegetable oil polyamides are also useful.

Above all, methacrylate copolymers as well as binary or ternary copolymers comprising methacrylates and styrene and derivatives thereof, as described in JP-A-58-121047, JP-A-58-127939, JP-A-58-139155 and JP-A-61-162052 and Japanese Patent Application Nos. 63-227831, 63-227832, 63-229161, 63-229162 and 63-229165 are used as a toner resin having a good resist property to an alkali etching solution for printing plates to be prepared by a method of dissolving a light-sensitive layer on an aluminium support with an alkaline etching solution.

As other preferred resins, ethylene copolymers as described in JP-A-63-41272 and JP-A-63-41273 are referred to. In general, a toner resin which has a good resist property to an alkali etching solution is hardly formed into a dispersion of fine grains by wet-dispersion method. Where a long-chain alkyl group having an affinity to a carrier liquid is introduced into the resin so as to improve the dispersibility thereof, the resist property of the resulting resin would be lower. Accordingly, a styrene copolymer having a high styrene content and having a strong resist property to alkali components is frequently used as the resin in that case.

It has been found that the graft copolymer of the present invention may well disperse the resins of the kind to form a dispersion of fine grains and therefore has a good dispersibility. In particular, resins alone may well be wet-dispersed by the use of the dispersing agent of the graft copolymer of the present invention to give a dispersion which is useful as a liquid developing agent for forming printing plates.

The liquid developing agent of the present invention can be prepared by any known method.

For example, where a colorant of pigment or dye is used alone as toner grains, it is wet-dispersed along with the dispersing agent of the present invention, and the resulting thick dispersion is diluted with a carrier liquid containing a charge-adjusting agent.

Where a fixing agent is used alone without any colorant, it is first powdered and the resulting powder is wet-dispersed along with the dispersing agent of the present invention in the same way as mentioned above.

Next, where the colorant to be dispersed is coated with a fixing resin, the colorant comprising a pigment or dye or a mixture of the two is first dispersed and kneaded along with the above-mentioned fixing resin and a good solvent to the resin, by the use of a dispersing machine such as ball mill, roll mill or paint shaker, and thereafter the solvent is removed by heating to obtain a blend.

Alternatively, the kneaded blend may be poured into a liquid which does not dissolve the resin for reprecipitation to obtain a blend.

As still another means, the colorant and the resin are heated up to a temperature higher than the melting point of the said resin and kneaded with a kneader, three-roll mixer, Bumbury's mixer or the like, and thereafter the kneaded blend is cooled to obtain a blend.

Next, the thus obtained blend is directly or after being dry-powdered, wet-dispersed along with the dispersing agent of the present invention to obtain a toner-containing thick liquid. In wet-dispersing, the solvent may be the carrier liquid itself, or a mixture comprising the carrier liquid and from 1 to 20% by weight of a good solvent to the resin, such as toluene or acetone, may also be used as the solvent.

As the wet-dispersing machine to be employed for the step, there are mentioned ball mill, paint shaker, dinomill and other various kinds of sand grinders. In particular, a dinomill dispersing machine which uses fine glass beads as the dispersion media is preferred. The graft copolymer of the present invention as prepared by the above-mentioned macromonomer method is incorporated into the dispersing agent during the wet-dispersion step.

In the present invention, it is important that the dispersing agent of the invention is present along with the graft copolymer in the wet-dispersion step. As opposed to this, if the dispersing agent is added to the polymer after the wet-dispersion step, the dispersion-stabilizing effect is not sufficient although the agent added could be somewhat effective. During the wet-dispersion step, the dispersing agent adsorbs not only to toner grains only but also to toner grains as ground between the rotating media or between the media and the wall of the dispersing machine container to thereby prevent aggregation of the ground grains, and successively the dispersing agent further adsorbs to the ground grains to also prevent aggregation of the grains. Accordingly, the efficiency of the wet-dispersion procedure is improved and, as a result, dispersion of the grains into fine grains is possible. If, however, the wet-dispersion step is effected in the absence of the dispersing agent of the invention, grinding of the toner grains only would occur and the ground grains would not be dispersed and stabilized. As a result, the ground grains would aggregate and the aggregate grains must again be ground. That is to say, grinding-aggregation is repeated in each step, and therefore it is impossible to obtain a dispersion of fine grains by the step. If the dispersing agent of the invention is added after the wet-dispersion step, the toner grains would still have the same grain size as those before the dispersion step and therefore could not be ground into finer grains.

Anyway, the intended dispersing effect may be attained only when the dispersing agent of the invention is present in the wet-dispersing step. Accordingly, the dispersing agent may also be added to the kneading step prior to the wet-dispersion step.

In the case of adding the dispersing agent to the kneading step, however, attention is to be paid to the fact that the coatability of the fixing resin over the pigment or dye is not lowered. Most preferably, therefore, the dispersing agent of the invention is added to the wet-dispersion step.

The amount of the dispersing agent to be added is from 0.01 to 20 parts by weight, preferably from 0.1 to 10 parts by weight, to one part by weight of toner-forming grains. The amount of the dispersing agent is defined in accordance with the difficulty or easiness of dispersion of the toner-forming grains to be dispersed therewith. That is to say, where the grains to be dispersed are relatively easily dispersed like the case comprising a colorant alone, the amount of the dispersing agent to be added may be relatively small. On the other hand, however, if a colorant as coated with a hardly dispersible coating agent is to be dispersed, a larger amount of the dispersing agent is necessary.

The concentration of the toner grains in the developing agent of the present invention is not specifically limited, but it may generally be from 0.01 g to 50 g, preferably from 0.1 g to 20 g, per liter of the liquid carrier therein. Where the toner grains contain a colorant, the resin content may be from 0.1 to 20 parts by weight, preferably from 0.5 to 10 parts by weight, to one part by weight of the colorant.

The concentration of the dispersing agent may be generally from 0.01 g to 5 g, preferably from 0.1 g to 20 g, per liter of the carrier liquid. Addition of the charge-adjusting agent to the developing agent may be effected by any other method than that mentioned above. For instance, the charge-adjusting agent may be added during kneading and/or wet-dispersion procedure. The amount of the charge-adjusting agent to be added is desirably controlled to be from 0.001 g to 10 g, more preferably from 0.01 g to 1 g, per liter of the developing agent.

As the photoconductive material for the photosensitive member to be employed in the present invention, various known inorganic or organic photoconductive material can be employed. In addition, a dielectric material which has been electrostatically charged by an electrostatic needle can be used.

As an organic photoconductive material, there are widely known organic photoconductive materials. Specific examples are disclosed, e.g., in Research Disclosure No. 10938 (May 1973) from page (1) (*Electrophotographic Element, Material and Process*).

Practically available ones include, e.g., an electrophotographic photoreceptor comprising a poly-N-vinylcarbazole and 2,4,7-trinitrofluorenone-9-one (U.S. Pat. No. 3,484,237), an electrophotographic photoreceptor in which poly-N-vinylcarbazole is sensitized by a pyrylium salt type dye (JP-B-48-25658), an electrophotographic photoreceptor comprising an organic pigment as a main component (JP-A-49-37543), an electrophotographic photoreceptor comprising an eutectic mixture made of a dye and a resin (JP-A-47-10735), an electrophotographic photoreceptor in which a copper phthalocyanine is dispersed in a resin (JP-B-52-1667). In addition, there are mentioned a compound disclosed in *Denshi Shashin Gakkai Shi* ("Journal of Association of Electrophotography"), vol. 25, No. 3 (1986), pages 62 to 76.

As an inorganic photoconductive material, typical examples are disclosed in R. M. Shaffert, *Electrophotography*, pages 260 to 374 (Focal Press, London, 1975). Specific examples are, e.g., zinc oxide, zinc sulfide, cadmium sulfide, selenium, tellurium alloy, selenium-arsenic alloy, selenium-tellurium-arsenic alloy.

The following examples are intended to illustrate the present invention in more detail but not to limit it in any way. All "parts" are by weight, unless otherwise specifically indicated.

PRODUCTION EXAMPLE 1 OF MACROMONOMER: M-1

A mixture of 100 g of methyl methacrylate, 2 g of mercaptopropionic acid, and 200 g of toluene was heated to 75° C. with stirring under nitrogen gas stream and, after adding 1.0 g of 2,2'-azobis-isobutyronitrile (A.I.B.N) to the reaction mixture, the reaction was carried out for 4 hours. Then, after adding 0.5 g of A.I.B.N. to the reaction mixture, the reaction was carried out for 3 hours and, after further adding thereto 0.3 g of A.I.B.N., the reaction was carried out for 3 hours. Then, 8 g of glycidyl methacrylate, 1.0 g of N,N-dimethyldodecylamine, and 0.5 g of t-butylhydroquinone were added to the reaction mixture, and the resulting mixture was stirred for 12 hours at 100° C. After cooling, the reaction mixture was reprecipitated from 2 liters of methanol to obtain 90 g of the desired macromonomer as a white powder. The weight average molecular weight of the product was 11,000.

Macromonomer M-1:

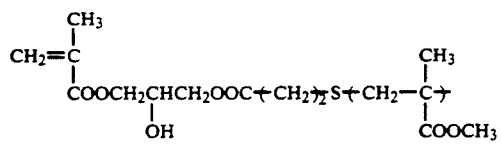

The molecular weight is a conversion value of polystyrene according to GPC method.

PRODUCTION EXAMPLE 2 TO 27 OF MACROMONOMERS: M-2 TO M-27

By following the same procedure as Production Example 1 of macromonomer except that each of the compound shown in Table 1 below was used in place of the methacrylate, each of Macromonomers M-2 to M-27 was produced. The weight average molecular weights of the macromonomers were from 10,000 to 15,000.

TABLE 1

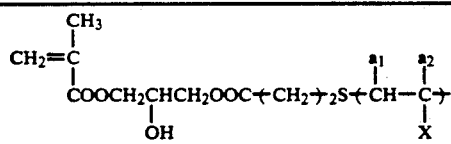

| Production Example of Macromonomer | Macromonomer | $a_1/a_2$ | X |
|---|---|---|---|
| 2 | M-2 | —H/—CH$_3$ | COOC$_2$H$_5$ |
| 3 | M-3 | " | COOC$_3$H$_7$(n) |
| 4 | M-4 | " | COOC$_4$H$_9$(n) |

TABLE 1-continued $$CH_2=\underset{\underset{OH}{|}}{\overset{\overset{CH_3}{|}}{C}}-COOCH_2CHCH_2OOC(CH_2)_2S(CH_2-\overset{a_1}{\underset{|}{C}}H-\overset{a_2}{\underset{|}{C}}-)_X$$

| Production Example of Macromonomer | Macro-monomer | $a_1/a_2$ | X |
|---|---|---|---|
| 5 | M-5 | " | $COOC_4H_9(i)$ |
| 6 | M-6 | " | $COOC_8H_{17}$ |
| 7 | M-7 | " | $COOC_{12}H_{25}$ |
| 8 | M-8 | " | $COOC_{13}H_{27}$ |
| 9 | M-9 | " | $COOC_{16}H_{33}$ |
| 10 | M-10 | " | $COOC_{18}H_{37}$ |
| 11 | M-11 | —H/—H | $COOCH_3$ |
| 12 | M-12 | " | $COOC_4H_9$ |
| 13 | M-13 | —H/—H | $COOC_{12}H_{25}$ |
| 14 | M-14 | " | $COOC_{18}H_{37}$ |
| 15 | M-15 | —CH$_3$/—H | $COOCH_3$ |
| 16 | M-16 | —H/—H | —C$_6$H$_5$ |
| 17 | M-17 | —H/—H | —C$_6$H$_4$CH$_3$ (p) |
| 18 | M-18 | " | CN |
| 19 | M-19 | —H/—CH$_3$ | $COOCH_2CHCH_2OCOCH_3$<br>     $\quad\quad\quad\underset{|}{OCOCH_3}$ |
| 20 | M-20 | " | $COO(CH_2)_2OCOC_9H_{19}$ |

TABLE 1-continued $$CH_2=\underset{\underset{COOCH_2\underset{\underset{OH}{|}}{CH}CH_2OOC+CH_2)_2S+\underset{\underset{X}{|}}{CH}-\underset{\underset{}{|}}{\overset{a_2}{\overset{|}{C}}}\overset{a_1}{\overset{|}{}}+}{|}}{\overset{CH_3}{\overset{|}{C}}}$$

| Production Example of Macromonomer | Macro-monomer | $a_1/a_2$ | X |
|---|---|---|---|
| 21 | M-21 | " | $COO(CH_2)_2OCOC_6H_{13}$ |
| 22 | M-22 | " | $COOCH_2CHCH_2OCOCH_3$<br>$\qquad\quad OCOC_3H_7$ |
| 23 | M-23 | " | $COO(CH_2)_2OCO(CH_2)_2COOCH_3$ |
| 24 | M-24 | —H/—H | $COO(CH_2)_2COOC_4H_9$ |
| 25 | M-25 | —H/—CH$_3$ | $COO(CH_2)_2COO(CH_2)_5OCOCH_3$ |
| 26 | M-26 | " | $COO(CH_2)_2O(CH_2)_2OCH_3$ |
| 27 | M-27 | —H/—H | phenyl-CH$_2$OC$_6$H$_{13}$ |

PRODUCTION EXAMPLE 28 OF MACROMONOMER: M-28

A mixture of 100 g of dodecyl methacrylate, 5 g of thioethanol, and 200 g of toluene was heated to 70° C. with stirring under nitrogen gas stream and, after adding 1.0 g of A.I.B.N. to the reaction mixture, the reaction was carried out for 4 hours. Then, after adding 0.5 g of A.I.B.N. to the reaction mixture, the reaction was carried out for 3 hours and, after further adding thereto 0.3 g of A.I.B.N., the reaction was carried out for 3 hours. The reaction mixture was cooled to room temperature and, after adding thereto 18.2 g of 2-carboxyethyl methacrylate, a mixture of 24 g of dicyclohexylcarbodiimide (D.C.C.) and 150 g of methylene chloride was added dropwise to the mixture over a period of one hour. Then, 1.0 g of t-butylhydroquinone was added to the reaction mixture, and the resulting mixture was stirred for 4 hours.

The crystals precipitated were filtered off and the filtrate obtained was reprecipitated from 2 liters of methanol. The oily material thus precipitated was collected by decantation, dissolved in 150 ml of methylene chloride, and the solution was reprecipitated again from one liter of methanol. The oily material formed was collected and dried under reduced pressure to obtain 54 g of the desired macromonomer having a weight average molecular weight of 5,800.

Macromonomer M-28:

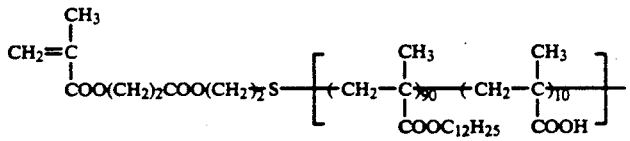

PRODUCTION EXAMPLES 29 TO 35 OF MACROMONOMER: M-29 TO M-35

By following the same procedure as Production Example 28 of macromonomer by changing the methacrylate monomer (dodecyl methacrylate) and the unsaturated carboxylic acid (2-carboxyethyl methacrylate), each of the macromonomer shown in Table 2 below was produced. The weight average molecular weights of the macromonomers were from 5,000 to 7,000.

TABLE 2

| Production Example of Macromonomer | Macromonomer | Chemical Structure of Macromonomer |
|---|---|---|
| 29 | M-29 | $CH_2=CH-COOCH_2CH_2S\text{+}CH_2-C(CH_3)(COOCH_3)\text{+}$ |
| 30 | M-30 | $CH_2=C(CH_3)-COOCH_2CH_2S\text{+}CH_2-C(CH_3)(COOCH_3)\text{+}$ |
| 31 | M-31 | $CH_2=CH-C_6H_4-COOCH_2CH_2S\text{+}CH_2-C(CH_3)(COOC_6H_{13})\text{+}$ |
| 32 | M-32 | $CH_2=CH-CH_2COOCH_2CH_2S\text{+}CH_2-C(CH_3)(COOC_8H_{17})\text{+}$ |
| 33 | M-33 | $CH_2=C(CH_3)-CONH\text{+}CH_2\text{+}_{10}-COOCH_2CH_2S\text{+}CH_2-C(CH_3)(COOC_{18}H_{37})\text{+}$ |
| 34 | M-34 | $CH_2=C(COOCH_3)-CH_2COOCH_2CH_2S\text{+}CH(CH_3)-CH(COOC_3H_7)\text{+}$ |
| 35 | M-35 | $CH_2=C(CH_3)-COO(CH_2)_7OCO(CH_2)_7COO(CH_2)_2S\text{+}CH_2-C(CH_3)(COOCH_3)\text{+}_{95}\text{+}CH_2-CH(COOH)\text{+}_{5}\text{+}$ |

PRODUCTION EXAMPLE 36 OF MACROMONOMER: M-36

A mixture of 70 g of n-dodecyl methacrylate, 30 g of t-butyl methacrylate, 4 g of 2-mercaptoethylamine, and 200 g of tetrahydrofuran was heated to 70° C. with stirring under nitrogen gas stream. Then, after adding 1.0 g of A.I.B.N. to the reaction mixture, the reaction was carried out for 4 hours and, after further adding thereto 0.5 g of A.I.B.N., the reaction was carried out for 4 hours. Then, the reaction mixture was cooled to 20° C. in a water bath and, after adding 6.5 g of triethylamine to the reaction mixture, 5.6 g of acrylic acid chloride was added dropwise to the mixture with stirring at a temperature below 25° C. and then the mixture was further stirred for one hour in situ. Thereafter, 0.5 g of t-butylhydroquinone was added thereto and the mixture was stirred for 4 hours at 60° C.

After cooling, the reaction mixture was reprecipitated from 2 liters of methanol and then the same procedure was repeated once to obtain 63 g of the desired macromonomer as a light-yellow viscous product having a weight average molecular weight of 6,600.

Macromonomer M-36:

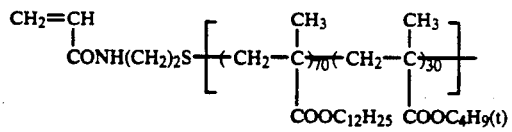

PRODUCTION EXAMPLE 37 OF MACROMONOMER: M-37

A mixture of 100 g of octadecyl methacrylate, 150 g of tetrahydrofuran, and 50 g of isopropyl alcohol was heated to 75° C. with stirring under nitrogen gas stream. After adding 4.0 g of 4,4-azobis(4-cyanovaleric acid) (A.C.V.) to the reaction mixture, the reaction was carried out for 5 hours and, after further adding thereto 1.0 g of A.C.V., the reaction was carried out for 4 hours. After cooling, the reaction mixture was reprecipitated from 1.5 liters of methanol, and an oily product thus precipitated was collected by decantation and dried under reduced pressure to obtain 85 g of an oily product.

To 50 g of the oily product (oligomer) obtained were added 15 g of glycidyl methacrylate, 1.0 g of N,N-dimethyldodecylamine, and 1.0 g of 2,2'-methylenebis(6-t-butyl-p-cresol), and the resulting mixture was stirred for 15 hours at 100° C. After cooling, the reaction mixture was reprecipitated from one liter of petroleum ether to obtain 42 g of the desired macromonomer as a white powder.

The weight average molecular weight thereof was 7,500.

Macromonomer M-37:

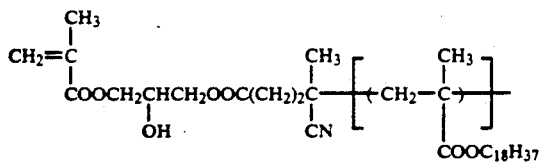

PRODUCTION EXAMPLE 38 OF MACROMONOMER: M-38

To a mixture of 50 g of the oligomer obtained as the intermediate in Production Example 37 of macromonomer, 2.8 g of 2-hydroxyethyl methacrylate, and 100 g of methylene chloride was added dropwise a mixture of 4.0 g of D.C.C., 0.5 g of 4-dimethylaminopyridine, and 10 g of methylene chloride with stirring at room temperature over a period of one hour, and the resulting mixture was stirred for 4 hours as it was. The crystals thus precipitated were filtered off, the filtrate was reprecipitated from one liter of methanol, and the procedure was repeated once again. Then, the powder formed was recovered and dried under reduced pressure to obtain 43 g of the desired macromonomer having a weight average molecular weight of 7,300.

Macromonomer M-38:

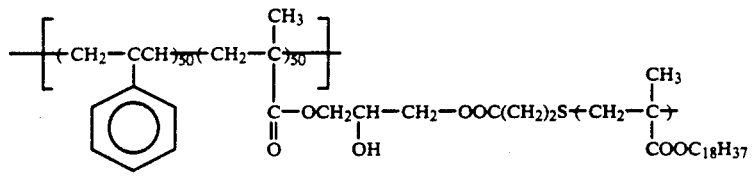

PRODUCTION EXAMPLE 1 OF RESIN FOR DISPERSING AGENT: P-1

A mixture of 50 g of styrene, 50 g of Macromonomer M-10, and 200 g of toluene which had placed in a four-neck flask was heated to 80° C. with stirring under nitrogen gas stream. After adding 1.0 g of 1,1'-azobis(1-cyclohexanecarbonyl) to the reaction mixture, polymerization was carried out at 80° C. for 24 hours. After cooling to room temperature, 200 g of toluene was added thereto and the reaction mixture was reprecipitated in 4 liters of methanol, and the white powder thus precipitated was collected by filtration and dried to obtain 92 g of the desired resin having a weight average molecular weight of $5.2 \times 10^4$ as a white powder.

Dispersion Agent P-1:

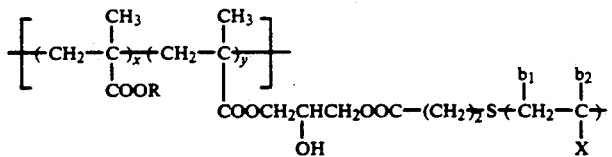

Macromonomer M-10 portion

PRODUCTION EXAMPLES 2 TO 15 OF RESIN FOR DISPERSING AGENT: P-2 to P-15

By following the same procedure as Production Example 1 of P-1 except that each of the compounds shown in Table 3 below was used in place of styrene and Macromonomer M-10, each of the resins for dispersing agents shown in Table 3 was produced.

The weight average molecular weights of the resins were from $3.0 \times 10^4$ to $6.0 \times 10^4$.

TABLE 3

$$\left[ +CH_2-\underset{\underset{COOR}{|}}{\overset{\overset{CH_3}{|}}{C}}\right)_x\!\!\left(CH_2-\underset{\underset{COOCH_2CHCH_2OOC-(CH_2)_7 S+CH_2-\underset{X}{\overset{b_2}{C}}\right)}{\overset{\overset{CH_3}{|}}{|}}\underset{OH}{\overset{}{}}}\right]$$

(x/y: weight composition ratio)

| Production Example of Resin | Resin for Dispersing Agent | R | x/y | b₁/b₂ | X |
|---|---|---|---|---|---|
| 2 | P-2 | —C₁₈H₃₇ | 70/30 | H/H | —⌬ |
| 3 | P-3 | —C₁₈H₃₇ | 90/10 | " | " |
| 4 | P-4 | —C₁₂H₂₅ | 60/40 | H/CH₃ | —COOCH₃ |

TABLE 3-continued

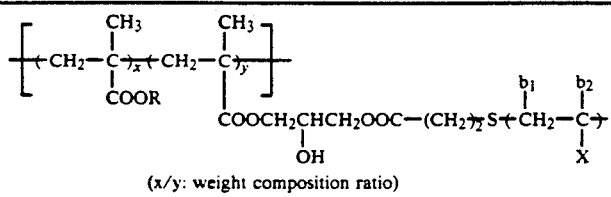

(x/y: weight composition ratio)

| Production Example of Resin | Resin for Dispersing Agent | R | x/y | $b_1/b_2$ | X |
|---|---|---|---|---|---|
| 5 | P-5 | $-C_{18}H_{37}$ | " | " | " |
| 6 | P-6 | $-CH_3$ | 40/60 | " | $-COOC_{18}H_{37}$ |
| 7 | P-7 | $-CH_2CHCH_2OCOCH_3$<br>$\quad\quad\vert$<br>$\quad\quad OCOCH_3$ | 50/50 | " | $-COOC_{16}H_{33}$ |
| 8 | P-8 | $-CH_2-CH-C_4H_9$<br>$\quad\quad\vert$<br>$\quad\quad C_2H_5$ | 90/10 | H/H | —⟨phenyl⟩ |
| 9 | P-9 | $-C_{18}H_{37}$ | 92/8 | H/H | $-CN$ |
| 10 | P-10 | $-C_{12}H_{25}$ | 80/20 | $H/-CH_3$ | $-COOCH_2CHCH_2OCOC_5H_{11}$<br>$\quad\quad\vert$<br>$\quad\quad OCOC_5H_{11}$ |
| 11 | P-11 | $-C_{13}H_{27}$ | 70/30 | " | $-COO(CH_2)_2OCOC_9H_{19}$ |
| 12 | P-12 | $-(CH_2)_2OCOC_{11}H_{23}$ | 75/25 | " | $-C_{12}H_{25}$ |
| 13 | P-13 | $-C_4H_9$ | 50/50 | " | $-C_{13}H_{27}$ |
| 14 | P-14 | $-CH_2CHC_4H_9$<br>$\quad\quad\vert$<br>$\quad\quad C_2H_5$ | 60/40 | " | $-C_{14}H_{29}$ |
| 15 | P-15 | $-C_{18}H_{37}$ | 70/30 | " | $-COO(CH_2)_2OCO(CH_2)_2COOCH_3$ |

PRODUCTION EXAMPLE 16 OF RESIN FOR DISPERSING AGENT: P-16

Resin for Dispersing Agent P-16:

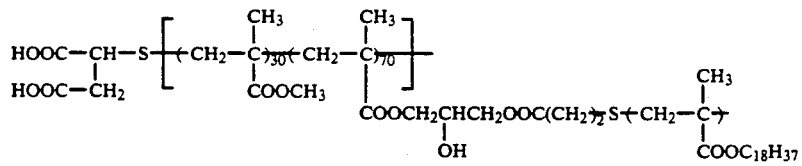

A mixture of 30 g of methyl methacrylate, 70 g of Macromonomer M-10, 0.8 g of thiomalic acid, 100 g of toluene, and 50 g of isopropyl alcohol was heated to 80° C. with stirring under nitrogen gas stream and, after adding 0.8 g of 1,1'-azobis(cyclohexane-1-carbonitril) (A.B.C.C.) to the reaction mixture, the reaction was carried out for 4 hours. After cooling, the reaction mixture was reprecipitated from 2 liters of methanol, and the white powder thus precipitated was collected by filtration and dried to obtain 78 g of the desired resin having a weight average molecular weight of $4.1 \times 10^4$ as a white powder.

PRODUCTION EXAMPLES 17 TO 25 OF RESIN FOR DISPERSING AGENT: P-17 to P-25

By following the same procedure as Production Example of P-16 except that each of the compounds shown in Table 4 below was used in place of methyl methacrylate, Macromonomer M-10, and the mercapto compound (thiomalic acid), each of the resins P-17 to P-25 was produced.

The weight average molecular weights of the resins were from $3.0 \times 10^4$ to $6 \times 10^4$.

TABLE 4

$$W-S\left[\left(CH_2-C(CH_3)\right)_{x_1}(X)_{x_2}(CH_2-C(CH_3))_y\right]$$
$$COOR \qquad\qquad COOR'$$

$$COO(CH_2)_2OOC(CH_2)_2S\left[CH_2-C(CH_3)\right]_y$$
$$COOR'$$

($x_1/x_2/y$: weight component ratio)

| Production Example of Resin | Resin for Dispersing Agent | —W | R | X | $x_1/x_2/y$ | R' |
|---|---|---|---|---|---|---|
| 17 | P-17 | HOOCCH$_2$— | —C$_{18}$H$_{37}$ | — | 70/0/30 | —C$_4$H$_9$ |
| 18 | P-18 | (2-carboxyphenyl)- with COOH | —C$_{12}$H$_{25}$ | — | 60/0/40 | —C$_{12}$H$_{25}$ |
| 19 | P-19 | benzene with COO(CH$_2$)$_2$, HOOC, COOH | —C$_{12}$H$_{25}$ | —CH$_2$—C(CH$_3$)(COOC$_4$H$_9$)— | 60/10/30 | —C$_4$H$_9$ |
| 20 | P-20 | benzene with COO(CH$_2$)$_2$, anhydride (O=C—O—C=O) | —CH$_3$ | — | 40/0/60 | —C$_{18}$H$_{37}$ |
| 21 | P-21 | HOCH—CH$_2$—HOCH$_2$ | —C$_4$H$_9$ | —CH$_2$CH(C$_6$H$_5$)— | 35/15/50 | —C$_{22}$H$_{25}$ |
| 22 | P-22 | HO—P(=O)(OH)—O(CH$_2$)$_2$— | —C$_{10}$H$_{21}$ | —CH$_2$—C(CH$_3$)(COOC$_{12}$H$_{25}$)— | 20/50/30 | —CH$_2$CHCH$_2$OCOC$_3$H$_7$ OCOC$_3$H$_7$ |

TABLE 4-continued
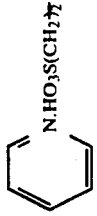
| Production Example of Resin | Resin for Dispersing Agent | —W | R | X | R' | x₁/x₂/y |
|---|---|---|---|---|---|---|
| 23 | P-23 | $H_5C_2O-\overset{O}{\underset{OH}{P}}-O(CH_2)_2$ | $-C_5H_{11}$ | — | $-C_{16}H_{33}$ | 40/0/60 |
| 24 | P-24 | N·HO₃S(C₆H₄)- (pyridinium sulfonate) | $-C_8H_{17}$ | $-CH_2-\underset{\underset{COO(CH_2)_2OCOC_{11}H_{23}}{CH_3}}{\overset{CH_3}{C}}-$ | $-C_{18}H_{37}$ | 30/30/40 |
| 25 | P-25 | HO(CH₂)₂- | $-C_{18}H_{37}$ | $-CH_2-\underset{\underset{COO(CH_2)_2N(C_2H_5)_2}{CH_3}}{\overset{CH_3}{C}}-$ | $-C_4H_9$ | 70/10/20 |

PRODUCTION EXAMPLES 26 TO 31 OF RESIN FOR DISPERSING AGENT: P-26 TO p-31

By following the same procedure as Production Example of P-1 except that each of the azobis compounds shown in Table 5 below was used in place of the polymerization initiator, A.B.C.C., each of the resins shown in Table 5 was produced.

The weight average molecular weights of the resins were from $3.0 \times 10^4$ to $6 \times 10^4$.

TABLE 5

| Production Example of Resin | Resin for Dispersing Agent | R is Azobis Compound |
|---|---|---|
| 26 | P-26 | HO—CH$_2$—C(CH$_3$)(CN)— |
| 27 | P-27 | HO—CH$_2$CH$_2$CH$_2$—C(CH$_3$)(CN)— |
| 28 | P-28 | HOCH$_2$CH$_2$NHCO—C(CH$_3$)(CH$_3$)— |
| 29 | P-29 | |
| 30 | P-30 | H$_3$C—C(HO—CH$_2$)(HO—CH$_2$)—NHCO—C(CH$_3$)(CH$_3$)— 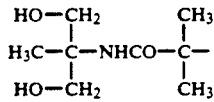 |

TABLE 5-continued

| Production Example of Resin | Resin for Dispersing Agent | R is Azobis Compound |
|---|---|---|
| 31 | P-31 | 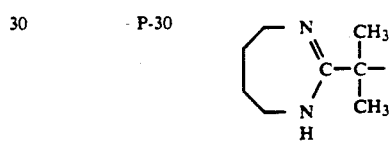 |

PRODUCTION EXAMPLE 32 OF RESIN FOR DISPERSING AGENT: P-32

A mixture of 85 g of n-dodecyl methacrylate, 15 g of Macromonomer M-28, and 150 g of toluene was heated to 75° C. with stirring under nitrogen gas stream and, after adding 1.0 g of A.I.B.N. to the reaction mixture, the reaction was carried out for 4 hours. Then, after adding 0.5 g of A.I.B.N. to the reaction mixture, the reaction was carried out for 3 hours and, after further adding 0.3 g of A.I.B.N. thereto, the reaction was carried out for 2 hours at 90° C. After cooling, the reaction mixture was reprecipitated from 2 liters of methanol, and the viscous product thus precipitated was collected by decantation and dried under reduced pressure to obtain 76 g of the desired resin having a weight average molecular weight of $4.3 \times 10^4$ as a transparent viscous product.

Resin for Dispersing Agent P-32:

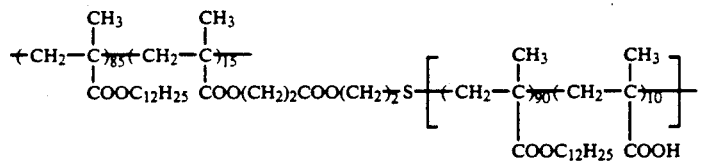

PRODUCTION EXAMPLES 33 TO 42 OF RESIN FOR DISPERSING AGENT: P-33 to P-42

By following the same procedure as Production Example of P-32 except that each of the mixtures shown in Table 6 below was used in place of n-dodecyl methacrylate and Macromonomer M-28, each of the resins P-33 to P 42 was produced.

The weight average molecular weights of the resins were from $3.5 \times 10^4$ to $4.5 \times 10^4$.

TABLE 6

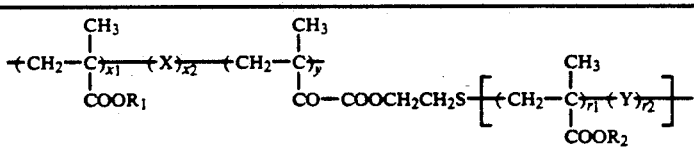

($x_1/x_2/y$ and $r_1/r_2$: weight component ratio)

| Production Example of Resin | Resin for Dispersing Agent | R$_1$ | —X— | $x_1/x_2/y$ | R$_2$ | —Y— | $r_1/r_2$ |
|---|---|---|---|---|---|---|---|
| 33 | P-33 | —C$_{18}$H$_{37}$ | — | 90/0/10 | —CH$_3$ | —CH$_2$—C(CH$_3$)(COOCH$_2$CH$_2$OH)— | 85/15 |

TABLE 6-continued $$\mathrm{+CH_2-\underset{\underset{COOR_1}{|}}{\overset{\overset{CH_3}{|}}{C}}\rangle_{x1}-(X)_{x2}-(CH_2-\underset{\underset{CO-COOCH_2CH_2S}{|}}{\overset{\overset{CH_3}{|}}{C}})_y-[(CH_2-\underset{\underset{COOR_2}{|}}{\overset{\overset{CH_3}{|}}{C}})_{r1}-(Y)_{r2}]}$$

($x_1/x_2/y$ and $r_1/r_2$: weight component ratio)

| Production Example of Resin | Resin for Dispersing Agent | $R_1$ | —X— | $x_1/x_2/y$ | $R_2$ | —Y— | $r_1/r_2$ |
|---|---|---|---|---|---|---|---|
| 34 | P-34 | " | — | 85/0/15 | —$C_4H_9$ | —$CH_2$—$CH$—($C_6H_4$)—COOH | 90/10 |
| 35 | P-35 | —$C_{12}H_{25}$ | —$CH_2$—$C(CH_3)(COOH)$— | 55/5/40 | —$C_{12}H_{25}$ | — | 100/0 |
| 36 | P-36 | —$C_{13}H_{27}$ | —$CH_2$—$CH(COO(CH_2)_2COOH)$— | 65/5/30 | —$C_{18}H_{37}$ | — | 100/0 |
| 37 | P-37 | —$C_{18}H_{37}$ | — | 80/0/20 | —$C_2H_5$ | —$CH_2$—$C(CH_3)(COO(CH_2)_2Cl)$— | 90/10 |
| 38 | P-38 | —$C_4H_9$ | —$CH_2$—$C(CH_3)(COO(CH_2)_2OCO(CH_2)_3COOH)$— | 35/5/60 | —$C_{16}H_{33}$ | — | 100/0 |
| 39 | P-39 | —$C_{12}H_{25}$ | —$CH_2$—$C(CH_3)(COOCH_2CHCH_2OCOCH_3)(OCOCH_3)$— | 60/20/20 | —$C_{12}H_{25}$ | —$CH_2$—$CH(COOH)$— | 95/5 |
| 40 | P-40 | —$C_5H_{11}$ | —$CH_2$—$C(CH_3)(COO(CH_2)_2OH)$— | 30/10/60 | —$C_{18}H_{37}$ | — | 100/0 |
| 41 | P-41 | —$C_{20}H_{41}$ | — | 80/0/20 | —$C_2H_5$ | —$CH_2$—$CH(CONH_2)$— | 90/10 |
| 42 | P-42 | —$C_{18}H_{37}$ | — | 85/0/15 | —$C_{10}H_{21}$ | —$CH_2$—$C(CH_3)(COO(CH_2)_2O-P(=O)(OH)_2)$— | 95/5 |

PRODUCTION EXAMPLE 43 OF RESIN FOR DISPERSING AGENT: P-43

A mixture of 80 g of octadecyl methacrylate, 20 g of Macromonomer M-1, and 150 g of toluene was heated to 75° C. with stirring under nitrogen gas stream and, after adding 1.0 g of A.C.V. to the reaction mixture, the reaction was carried out for 4 hours. Then, after adding 0.3 g of A.C.V. to the reaction mixture, the reaction was carried out for 2 hours and, after further adding 0.3 g of A.C.V. thereto, the reaction was carried out for 3 hours. After cooling, the reaction mixture was reprecipitated from 2 liters of methanol, and the white powder thus precipitated was collected and dried to obtain 76 g of the desired resin having a weight average molecular weight of $4.8 \times 10^4$ as a powder.

Resin for Dispersing Agent P-43:

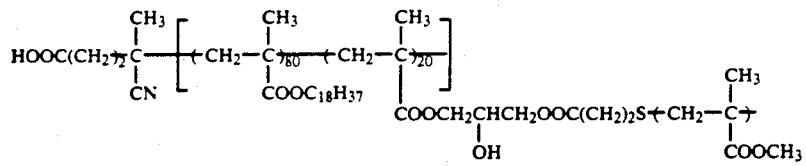

PRODUCTION EXAMPLES 44 TO 57 OF RESIN FOR DISPERSING AGENT: P-44 to P-57

By following the same procedure as Production Example of P-43 except that each of the mixtures shown in Table 7 was used in place of octadecyl methacrylate and Macromonomer M-1, each of the resins P-44 to P-57 was prepared.

The weight average molecular weights of the resins was from $3.5 \times 10^4$ to $5.0 \times 10^4$.

ing a nitrogen gas thereinto. Next, 1 g of 1,1'-azobis(1-cyclohexanecarbonitrile) was added thereto as a polymerization initiator and the reactants in the flask were polymerized at 80° C. for 24 hours. After polymerization, the reaction mixture was cooled to room temperature, 100 g of toluene was added thereto and the resulting mixture was reprecipitated in 4 liters of methanol. The reprecipitated solid was washed several times with methanol and then dried in vacuum. A white powder having an average molecular weight of $6.0 \times 10^4$ was

TABLE 7

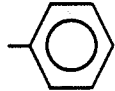

| Production Example of Resin | Resin for Dispersing Agent | R | x/y | $b_1/b_2$ | X |
|---|---|---|---|---|---|
| 44 | P-44 | $-C_{16}H_{33}$ | 85/15 | $H/-CH_3$ | $-COOCH_3$ |
| 45 | P-45 | $-C_{12}H_{25}$ | 90/10 | " | " |
| 46 | P-46 | " | 60/40 | " | $-COOC_{18}H_{37}$ |
| 47 | P-47 | $-C_{18}H_{37}$ | " | " | " |
| 48 | P-48 | $-CH_3$ | 40/60 | " | " |
| 49 | P-49 | $-CH_2CHCH_2OCOCH_3$<br>       $\vert$<br>      OCOCH_3 | 50/50 | " | $-COOC_{16}H_{33}$ |
| 50 | P-50 | $-C_{18}H_{37}$ | 90/10 | H/H | -⟨phenyl⟩ |
| 51 | P-51 | $-C_{18}H_{37}$ | 92/8 | " | $-CN$ |
| 52 | P-52 | $-C_{12}H_{25}$ | 80/20 | $H/-CH_3$ | $-COOCH_2CHCH_2OCOC_5H_{11}$<br>             $\vert$<br>           OCOC_5H_{11} |
| 53 | P-53 | $-C_{13}H_{27}$ | 70/30 | " | $-COO(CH_2)_2OCOC_9H_{19}$ |
| 54 | P-54 | $-(CH_2)_2OCOC_{12}H_{23}$ | 75/25 | " | $-C_{12}H_{25}$ |
| 55 | P-55 | $-C_4H_9$ | 50/50 | " | $-C_{13}H_{27}$ |
| 56 | P-56 | $-CH_2CHC_4H_9$<br>      $\vert$<br>      $C_2H_5$ | 60/40 | " | $-C_{14}H_{29}$ |
| 57 | P-57 | $-C_{18}H_{37}$ | 70/30 | " | $-COO(CH_2)_2OCO(CH_2)_2COOCH_3$ |

PRODUCTION EXAMPLE 58 OF RESIN FOR DISPERSING AGENT: P-58

A graft copolymer was produced, using a styrene macromonomer which is sold by Toa Gosei Chemical Industry Co. under the trade name of AS-6.

Precisely, 10 g of AS-6, 90 g of 2-ethylhexyl methacrylate and 200 g of toluene were put in a 400 ml-four neck flask equipped with a stirrer, a thermometer, a condenser and a nitrogen gas-introducing duct and heated and stirred at 80° C. for one hour with introducobtained.

PRODUCTION EXAMPLES 59 TO 67 OF RESIN FOR DISPERSING AGENT: P-59 to P-67

Resins P-59 to P-67 were produced in the same manner as in Production Example of P-58, except that commercially available macromonomers AS-6 (styrene macromonomer) or AA-6 (methyl methacrylate macromonomer) shown in Table 8 below was employed in place of 2-ethylhexyl methacrylate, respectively.

TABLE 8

| Production Example of Resin | Resin for Dispersing Agent | Macromonomer A | Comonomer B | A/B | Molecular Weight |
|---|---|---|---|---|---|
| 59 | P-59 | AS-6 Styrene Macromonomer | Stearyl Methacrylate | 5/95 | $6.5 \times 10^4$ |
| 60 | P-60 | AS-6 Styrene Macromonomer | " | 20/80 | $5.5 \times 10^4$ |
| 61 | P-61 | AS-6 Styrene Macromonomer | Lauryl Methacrylate | 10/90 | $6.1 \times 10^4$ |
| 62 | P-62 | AS-6 Styrene Macromonomer | 2-Ethylhexyl Methacrylate | 10/90 | $6.3 \times 10^4$ |
| 63 | P-63 | AA-6 Methylmethacrylate Macromonomer | Stearyl Methacrylate | 10/90 | $5.7 \times 10^4$ |
| 64 | P-64 | AA-6 Methylmethacrylate Macromonomer | Lauryl Methacrylate | 10/90 | $5.8 \times 10^4$ |
| 65 | P-65 | AA-6 Methylmethacrylate Macromonomer | 2-Ethylhexyl Methacrylate | 10/90 | $6.1 \times 10^4$ |
| 66 | P-66 | AA-2 Methylmethacrylate Macromonomer | Lauryl Methacrylate | 10/90 | $5.3 \times 10^4$ |
| 67 | P-67 | AB-6 | Stearyl Methacrylate | 30/70 | $5.9 \times 10^4$ |
| 68 | P-68 | AS-6 | " | 50/50 | $5.6 \times 10^4$ |

COMPARATIVE PRODUCTION EXAMPLE 1 OF RESIN FOR DISPERSING AGENT: R-1

10 g of styrene, 90 g of stearyl methacylate and 200 g of toluene were put in the same four-neck flask as that employed in Example 1 and heated for 1 hour at 80° C. with introducing a nitrogen gas thereinto. Next, 1 g of a polymerization initiator 1,1'-azobis(1-cyclohexanecarbonitrile) was added thereto and the reactants were polymerized at 80° C. for 24 hours. The reaction mixture was then reprecipitated in methanol in the same manner as in Example 1 to obtain a polymer. The polymer thus obtained was a random copolymer.

COMPARATIVE PRODUCTION EXAMPLES 2 AND 3: R-2 AND R-3

Random copolymers (R-2 and R-3) were prepared in the same manner as in Comparative Production Example 1, except that lauryl methacrylate or stearyl methacrylate was employed in place of stearyl methacrylate, respectively.

COMPARATIVE PRODUCTION EXAMPLES 4 to 6: R-4 to R-6

Random copolymers (R-4, R-5, R-6) were prepared in the same manner as in the previous Comparative Production Examples 1, 2 and 3, except that methyl methacrylate was employed in place of styrene. Comonomers used were as follows, and the copolymerization ratio was 10/90, by weight.
Comparative Production Example 4 (R-4):
  Methyl Methacrylate/Stearyl Methacrylate
Comparative Production Example 5 (R-5):
  Methyl Methacrylate/Lauryl Methacrylate
Comparative Production Example 6 (R-6):
  Methyl Methacrylate/2-Ethylhexyl Methacrylate

COMPARATIVE PRODUCTION EXAMPLE 7: R-7

A graft copolymer was prepared in accordance with the method described in JP-B-60-18985 and JP-B-57-12985. The method is different from the macromonomer method of producing the graft copolymers of the present invention.

The weight average molecular weight was $5.7 \times 10^4$ to $6.4 \times 10^4$. The molecular weight is a St conversion Precisely, 300 g of toluene was heated up to 90° C. with applying a nitrogen gas thereto. A mixture solution comprising 180 g of lauryl methacrylate, 5 g of glycidyl methacrylate and 1 g of benzoyl peroxide was dropwise added thereto over a period of 2 hours and then the whole was heated and stirred. Next, 0.5 g of lauryldimethylamine, 3 g of methacrylic acid and 0.1 g of hydroquinone were added thereto and reacted for 8 hours at 90° C. 300 g of toluene was added to the resulting reaction mixture and a solution comprising 20 g of styrene and 1 g of azobisisobutyronitrile was dropwise added thereto over a period of one hour, and then the whole was stirred for further one hour.

After being cooled to room temperature, the reaction mixture was poured into 8 liters of methanol for reprecipitation. The thus reprecipitated solid was then washed several times with methanol and dried in vacuum. In accordance with the method, the monomer to be the stem is first copolymerized with the glycidyl methacrylate to be a graft-active point, and thereafter the glycidyl methacrylate and acrylic acid are esterified so that the double bond is introduced into the copolymer to be the stem via the ester bond. Next, the monomer to be the graft is copolymerized to finally obtain the intended graft copolymer.

In the method, the amount of glycidyl methacrylate was increased so as to increase the graft-active points. However, when 15 g or more glycidyl methacrylate was added, the reaction mixture was geled.

TABLE 9

| Comparative Production Example | Resin for Comparison | Monomer A | Monomer B | A/B | Molecular Weight |
|---|---|---|---|---|---|
| 1 | R-1 | Styrene | Stearyl Methacrylate | 10/90 | $6.3 \times 10^4$ |
| 2 | R-2 | " | Lauryl Methacrylate | 10/90 | $5.7 \times 10^4$ |

TABLE 9-continued

| Comparative Production Example | Resin for Comparison | Monomer A | Monomer B | A/B | Molecular Weight |
|---|---|---|---|---|---|
| 3 | R-3 | " | 2-Ethylhexyl Methacrylate | 10/90 | $6.4 \times 10^4$ |
| 4 | R-4 | Methyl Methacrylate | Stearyl Methacrylate | 10/90 | $6.0 \times 10^4$ |
| 5 | R-5 | " | Lauryl Methacrylate | 10/90 | $6.2 \times 10^4$ |
| 6 | R-6 | " | 2-Ethylhexyl Methacrylate | 10/90 | $6.3 \times 10^4$ |
| 7 | Graft copolymer according to JP-B-57-12985 and JP-B-60-18985 | | | | |
|  | R-7 | Styrene | Lauryl Methacrylate | 10/90 | $5.8 \times 10^4$ |

EXAMPLE 1

The graft copolymers as prepared by the macromonomer method of the present invention (P-3 and P-8), the random copolymers having the same monomer compositions as those of Graft Copolymers R-1 and R-3, and the graft copolymer R-7 as prepared by the method of JP-B-57-12985 and JP-B-60-18985 were compared with each other, with respect to the dispersibility of a pigment alone. The results obtained are shown in Table 10 below.

| | |
|---|---|
| Carbon Black #30 (product by Mitsubishi Kasei Corp.) | 2.5 parts |
| Dispersing Agent Isoper H 10 wt % | 2.5 parts |
| Isopar H (product of Exon Chemical Co.) | 2.5 parts | were dispersed for 2 hours in a paint shaker (product by Toyo Seiki Co.) along with glass beads as dispersing media.

The resulting dispersion was diluted with Isoper H, and the dispersed condition and the grain size were observed. The grain size was a value as measured with a nanosizer (manufactured by Nikkaki Co.).

TABLE 10

| Dispersing Agent | Dispersed Condition | Grain Size |
|---|---|---|
| Graft Copolymer P-3 | Uniformly dispersed | 0.19 micron |
| Graft Copolymer P-8 | Uniformly dispersed | 0.24 micron |
| Comparative Copolymer R-1 | Non-dispersed grains remained | 0.33 micron |
| Comparative Copolymer R-3 | Non-dispersed grains remained | 0.37 micron |
| Comparative Copolymer R-7 | Almost uniformly | 0.29 micron |

All the dispersing agents tested showed some dispersibility. However, the dispersion obtained by the use of R-1 or R-3 contained some granular solids to be derived from the non-dispersed grains. As opposed thereto, the graft comb-like copolymers of the present invention and the graft copolymer as obtained by the method of JP-B-57-12985 and JP-B-60-18985 showed a uniform dispersibility.

The dispersed condition was observed with the naked eye. Precisely, a diluted dispersion to have a dispersed solid concentration of 1 g/liter was put in a glass container, and the condition of the dispersion was observed with the naked eye through the container.

EXAMPLE 2

The same process as in Example 1 was repeated except that carbon black was replaced by titanium oxide (wurtzite structure), and the resulting dispersions were observed in the same way. The results obtained are shown in Table II below.

The graft copolymers of the present invention showed an excellent dispersibility. Additionally, the same results were also obtained when a zinc oxide powder was used and the graft copolymers of the present invention showed an excellent dispersibility.

TABLE 11

| Dispersing Agent | Dispersed Condition | Grain Size |
|---|---|---|
| Graft Copolymer P-3 | Uniformly dispersed | 0.27 micron |
| Graft Copolymer P-8 | Uniformly dispersed | 0.35 micron |
| Comparative Copolymer R-1 | Many non-dispersed grains remained | 1.85 microns |
| Comparative Copolymer R-3 | Many non-dispersed grains remained | 3.00 microns |
| Comparative Copolymer R-7 | Almost uniformly dispersed | 0.85 micron |

EXAMPLE 3

In the example, the dispersibility of a colorant as prepared by coating a pigment with a fixing resin was examined.

| | |
|---|---|
| Carbon Black #30 (product by Mitsubishi Kasei Corp.) | 1 part |
| Methyl methacrylate/stearyl methacrylate copolymer (9/1, by mol) | 2 parts | were melted and kneaded for 20 minutes with a three-roll mill as heated at 120° C. This was then ground with a pin mill and then wet-dispersed as a composition comprising the following components.

| | |
|---|---|
| Ground product | 2 parts |
| Dispersing agent (10 wt % Isopar H solution) | 20 parts |
| Isopar H | 20 parts |

The composition was dispersed with a paint shaker in the same way as in Example 1. The dispersing agents used were Graft Copolymers P-3 and P-8 and Comparative Copolymers R-1, R-3 and R-7.

Where Comparative Copolymer R-1 or R-3 was used, the ground product became sticky to form coagulated solids and, as a result, dispersion was completely impossible.

On the other hand, where Graft Copolymer P-3 or P-8 or Comparative Copolymer R-7 was used, dispersion was effected well without formation of such coagulated solids.

The resulting dispersions were diluted in the same manner as in Example 1 and the dispersed condition and the grain size were measured in the same way. The results obtained are shown in Table 12 below.

TABLE 12

| Dispersing Agent | Dispersed Condition | Grain Size |
|---|---|---|
| Graft Copolymer P-3 | Uniformly dispersed | 0.33 micron |
| Graft Copolymer P-8 | Uniformly dispersed | 0.40 micron |

TABLE 12-continued

| Dispersing Agent | Dispersed Condition | Grain Size |
|---|---|---|
| Comparative Copolymer R-1 | Coagulated solids were formed during wet-dispersion | Not measured |
| Comparative Copolymer R-3 | Coagulated solids were formed during wet-dispersion | Not measured |
| Comparative Copolymer R-7 | Almost uniformly dispersed with many precipitates | 0.75 micron |

The dispersion obtained by the use of the dispersing agent of Comparative Copolymer R-7 had larger grains than those obtained by the use of the dispersing agents of Graft Copolymers P-3 and P-8. Additionally, the diluted dispersion from the former contained many precipitates. Accordingly, the dispersibility of the dispersing agent of Comparative Copolymer R-7 was poor.

EXAMPLE 4

Each of the dispersions obtained in the previous Example 3 (dispersions as dispersed with dispersing agents of Graft Copolymers P-3 and P-8 and Comparative Copolymer R-7) was diluted with Isopar G (product by Exon Chemical Co.) to have a pigment solid concentration of 1 g/liter, whereupon a charge-adjusting agent of the above-mentioned formula (VII) where $R_1$=n-$C_8H_{18}$, $R_2$=n-$C_{13}H_{27}CO$, X=Ti, A=$C_2H_4$ and n=2 was added thereto in an amount of $1\times10^{-4}$M per liter of Isopar G. Accordingly, three kinds of liquid developing agents were prepared. All had a negative polarity.

Each of the thus prepared liquid developing agents was used for development with Panacopy KV-3000 (manufactured by Matsushita Electric Co.). As a result, good images were obtained with high resolving power and good tone reproducibility when the liquid developing agent contained the dispersing agent of the present invention. However, when a liquid developing agent containing Comparative Copolymer R-7 as the dispersing agent was used, large toner grains adhered near the images formed and the image was seen to be somewhat rough.

With respect to a stain in the developed portion, there were little stains in a case of the liquid dispersing agent containing the dispersing agent of the present invention, but there were remarkable stains in a case of the liquid dispersing agent containing R-7, (which was compared after taking 100 slides).

Next, the liquid developing agents were stored for 3 months at room temperature and then observed. As a result, the amount of the precipitate formed was small in the liquid developing agents containing the dispersing agents of the present invention (P-3, P-8), which additionally showed a good redispersiblity. As opposed to them, the amount of the precipitate formed in the liquid developing agent containing the dispersing agent of Comparative Copolymer R-7 was large and the redispersibility of the liquid developing agent was bad. Each of the thus stored liquid developing agents was used for development in the same manner as mentioned above. As a result, the agents containing the graft copolymers of the present invention gave almost the same images as those obtained by the use of the fresh agents. However, where the stored liquid developing agent containing Comparative Copolymer R-7 was used not only the roughness of the images formed increased but also flow of the images formed occurred.

In Examples 1 and 3, the graft copolymers of the present invention all showed an excellent dispersibility. However, the random copolymers of Comparative Examples, having the same monomer composition as that of the graft copolymers of the present invention, could not well disperse the fixing resin-coated pigment, although they could disperse the pigment alone. On the other hand, the graft copolymer of R-7 showed some dispersiblity in dispersing both the pigment alone and the resin-coated pigment in some degree. However, the dispersiblity of the resin-coated pigment is still unsatisfactory. Therefore when the graft copolymer of R-7 was used to form a liquid developing agent, the resulting agent could not give a good image by development.

EXAMPLE 5

The same process as in Example 2 was repeated, except that Graft Copolymer P-61 and Comparative Copolymer R-2 were used as the dispersing agent. When Comparative Copolymer R-2 was used as the dispersing agent, dispersion could not be effected at all since the system formed one coagulated large mass as a whole during the procedure.

As opposed to this, when Graft Copolymer P-61 was used as the dispersing agent, a uniform dispersion was formed.

TABLE 13

| Dispersing Agent | Dispersed Condition | Grain Size |
|---|---|---|
| Graft Copolymer R-61 | Uniformly dispersed | 0.31 micron |
| Comparative Copolymer R-2 | Coagulated solids were formed during wet-dispersion | Not measured |

EXAMPLE 6

The same charge-adjusting agent as that employed in Example 4 was added to the dispersion prepared in Example 5, and this was used for development in the same manner as in Example 4. As a result, images were formed with good reproducibility of fine lines and image gradation.

EXAMPLE 7

In the example, dispersibility of a fixing resin alone was examined in the absence of a colorant of pigment or dye.

| | |
|---|---|
| Fixing resin Styrene/vinyl toluene/lauryl methacrylate/trimethylammonium ethyl acrylate (cation: p-toluenesulfonic acid radical) copolymer (with copolymerization ratio of 49/49/1/1, by mol) | 1 part |
| Dispersing agent (10 wt % Isopar H solution) | 10 parts |
| Isopar H | 10 parts |

(Fixing resin was previously ground with a pin mill or the like grinder)

The above-mentioned composition was dispersed with a paint shaker for 4 hours in the same manner as in Example 1.

The dispersing agent used here was Graft Copolymer P-3, Comparative Copolymer R-1 or Comparative Copolymer R-7. The results obtained are shown in Table 14 below.

TABLE 14

| Dispersing Agent | Dispersed Condition | Grain Size |
| --- | --- | --- |
| Graft Copolymer P-3 | Uniformly dispersed | 0.35 micron |
| Comparative Copolymer R-1 | The resin solidified into one solid | Not measured |
| Comparative Copolymer R-7 | Grains of several mm size were formed | Not measured |

Graft Copolymer P-3 of the present invention showed an excellent dispersiblity. However, dispersion was impossible when Comparative Copolymer R-7 was employed. Where Comparative Copolymer R-1 was employed, the fixing resin formed one solid and dispersion was quite impossible.

EXAMPLE 8

The dispersion containing the dispersing agent of Graft Copolymer P-3 as prepared in Example 7 was diluted with Isopar G to have a fixing resin content of 1 g/liter. A charge-adjusting agent of zirconium naphthenate was added thereto in a concentration of $1 \times 10^{-5}$M, to prepare a positive-charged liquid developing agent.

A printing plate precursor, which will be mentioned below, was positively charged by the use of a corona-charging device and then imagewise exposed. This was then developed with the previously prepared developing agent by a conventional method for reversal development. The plate precursor was then heated at 140° C. for 2 minutes so as to fix the image thereon.

Next, this was dipped in an etching solution prepared by dissolving 40 parts of potassium silicate, 10 parts of potassium hydroxide, 10 parts of benzyl alcohol and 90 parts of ethanol in 900 parts of water so that the non-image portions were removed. This was then fully washed with water. In the thus obtained printing plate, from 5% to 95% of dot images of 150 lines/inch were sufficiently reproduced.

The liquid developing agent of the example was prepared by dispersing only a fixing resin with the dispersing agent of the present invention, and it can be used in the field of printing plates where the agent is required to have only a resist property or an ink-adhesiveness.

Formation of Printing Plate Precursor:

The surface of JIS1050 aluminium sheet was sandblasted with a rotary nylon brush, using a pamis-water suspension as an abrasive. The surface roughness (center line average roughness) of the thus surface-treated sheet was 0.5 micron. After washing with water, this was dipped in a 10% aqueous sodium hydroxide solution at 70° C. for etching, whereupon the etched aluminium amount was 6 g/m². This was again washed with water and then dipped in a 30% aqueous nitric acid solution for one minute for neutralization. This was further again washed with water sufficiently. Afterwards, this was subjected to electrolytic surface-roughening treatment for 20 seconds, by the use of a square wave of an alternating wave form having an anode voltage of 13 volts and a cathode voltage of 6 volts (described in JP-B-55-19191) in a 0.7% aqueous nitric acid solution and then dipped in a 20% sulfuric acid solution at 50° C. so as to wash the treated surface. Then this was further washed with water. Next, this was subjected to anodic oxidation treatment in a 20% aqueous sulfuric acid solution, whereupon the weight of the oxide film on the anode was 3.0 g/m². Finally, this was washed with water and dried to obtain the intended printing plate precursor.

Next, a photoconductive layer-coating composition comprising the components mentioned below was coated on the surface of the precursor with a bar coater and dried at 120° C. for 10 minutes.

Photoconductive Layer-Coating Composition:

1. Hydrazone compound having the following formula: — 2.5 parts

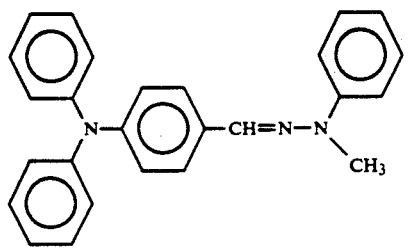

2. Benzyl Methacrylate/Methacrylic Acid Copolymer (methacrylic acid content: 40 mol %) — 75 parts
3. Thiopyrylium salt compound having the following formula: — 1.18 parts

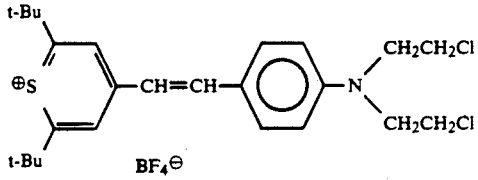

4. Methylene Chloride — 510 parts
5. Methyl Cellosolve Acetate — 150 parts

The dry film thickness of the photoconductive layer thus formed on the printing plate precursor was 4 microns.

EXAMPLES 9 TO 13

Dispersing agents shown in Table 15 below (each having a different copolymerization ratio of AS-6 (styrene macromonomer) and stearyl methacrylate) were used for dispersing the same fixing resin-coated carbon black as that employed in Example 2, and the dispersibility of the resin-coated colorant was examined. The results obtained are shown in Table 15 below.

TABLE 15

| Example | Dispersing Agent | | Dispersed Condition | Grain Size |
| --- | --- | --- | --- | --- |
| 9 | Graft Copolymer I-59 | AS-6/Stearyl Methacrylate (5/95, by weight) | Uniformly dispersed. | 0.35 micron |
| 10 | Graft Copolymer I-58 | AS-6/Stearyl Methacrylate (10/90, by weight) | Uniformly dispersed. | 0.31 micron |
| 11 | Graft Copolymer I-60 | AS-6/Stearyl Methacrylate (20/80, by weight) | Uniformly dispersed. | 0.31 micron |
| 12 | Graft Copolymer I-67 | AS-6/Stearyl Methacrylate (30/70, by weight) | Uniformly dispersed. | 0.31 micron |
| 13 | Graft Copolymer I-68 | AS-6/Stearyl Methacrylate | Uniformly dispersed. | 0.27 micron |

TABLE 15-continued

| Example | Dispersing Agent | Dispersed Condition | Grain Size |
|---|---|---|---|
| | (50/50, by weight) | | |

All the dispersing agents tested showed an excellent dispersibility, as the uniformity of the dispersions obtained was good. In the cases of Examples 11 and 12, a part of the dispersing agent used acted as insoluble grains in Isopar H or G. However, there was no difference in the dispersibility between the dispersing agents of Examples 5 and 6 and those of Examples 11 and 12.

EXAMPLE 14

The same charge-adjusting agent as that employed in Example 2 was added to each of the dispersions obtained in the previous Example 24, to obtain negative-charged liquid developing agents.

These were used for development by the use of a photosensitive member, which will be mentioned below. As a result, good images were obtained with excellent resolving power. Precisely, the images obtained had little roughness in the edges thereof and had an excellent gradation reproducibility.

After the developing agents were stored for 3 months or more at room temperature, little precipitate was formed. Redispersibility of the precipitate formed was good.

The agents were further stored for one year or more at room temperature and the thus stored agents gave almost the same images as those obtained by the use of the fresh agents.

Formation of Photosensitive Member:

10 g of polycarbonate (Lexan 121, product by G.E. Co.), 6 g of diarylamine compound mentioned below and 60 mg of styryl dye (sensitizer) mentioned below were dissolved in 80 ml of methylene chloride.

Next, the resulting solution was coated on a 100 micron-polyethylene terephthalate film having a palladium-plated layer thereon by the use of a wire bar and then dried to remove the coating solvent therefrom. Accordingly, a photoconductive layer having a thickness of 6 microns was formed on the film to obtain an electrophotographic light-sensitive material. The surface of the film was charged to +400 V and thereafter imagewise exposed through a positive original to form an electrostatic latent image thereon.

Diarylamine Compound:

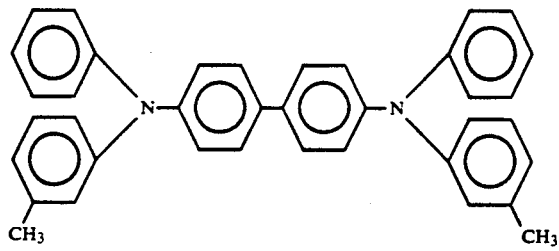

Styryl Dye:

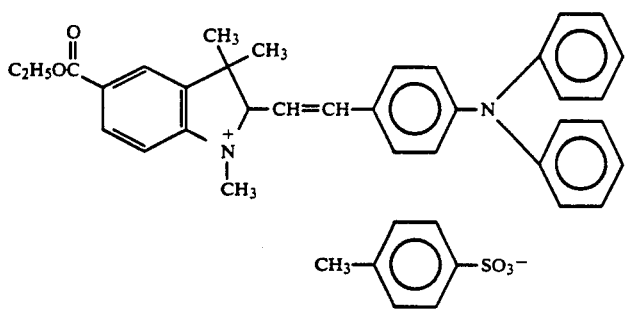

EXAMPLE 15

When the liquid developing agents of Example 14 was developed with a cassette file 7000R system (an electronic file system of Fuji Photo Film Co., Ltd.), an image having satisfactory gradation reproducibility excellent in resolving power was obtained.

After taking 10,000 frames (photograph), when the same developing agents was used, there were little stains in the developed portion in all of the developing agents.

The graft copolymers as prepared by the macromonomer method of the present invention showed an excellent dispersibility by dispersing any of a colorant such as pigment or dye, or a colorant as coated with a fixing resin, or a fixing resin. The liquid developing agent as prepared by the use of the dispersing agent of the graft copolymer of the invention displayed a high resolving power and an excellent gradation reproducibility. Additionally, the agent showed an excellent storage stability for a long period of time and a good redispersibility of the precipitate formed in the agent after storage thereof.

While the invention has been described in detail and with reference to specific embodiments thereof, it will be apparent to one skilled in the art that various changes and modifications can be made therein without departing from the spirit and scope thereof.

What is claimed is:

1. A liquid developing agent for electrostatic photography, which contains one or more of a pigment or dye, a resin insoluble in or swellable with a carrier liquid and a pigment or dye as coated with the resin, and a dispersing agent and a charge-adjusting agent in a non-aqueous solvent carrier liquid having a dielectric constant of 3 or less and a volume specific resistance of $10^9$ Ωcm or more, wherein the dispersing agent comprises a graft copolymer, wherein monomer(s) to constitute the graft portion(s) of the graft copolymer is(are) at least one or more macromonomers each having a terminal polymerizable functional group, wherein the graft copolymer is substantially soluble in a non-aqueous solvent having a dielectric constant of 3 or less and a volume specific resistance of $10^9$ Ωcm or more, and wherein said graft copolymer is a copolymer comprising (1) at least one mono-functional macromonomer (M) having a weight average molecular weight of from $1 \times 10^3$ to $4 \times 10^4$, and (2) at least one monomer represented by formula (III), said monofunctional macromonomer (M) having a polymerizable double bond group represented by formula (I) bonded to only one terminal of a polymer main chain containing at least one kind of a polymer component represented by formula (IIa) or (IIb):

wherein V is

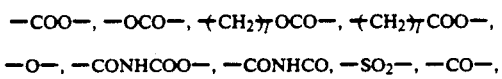

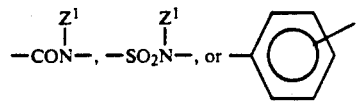

(wherein $Z^1$ is hydrogen atom or a hydrocarbon group and l represents an integer of from 1 to 3); $a^1$ and $a^2$, which may be the same or different, each is a hydrogen atom, a halogen atom, a cyano group, a hydrocarbon group, —COO—$Z^2$, or —COO—$Z^2$ bonded via a hydrocarbon group (wherein $Z^2$ is a hydrogen atom or a hydrocarbon group which may be substituted:

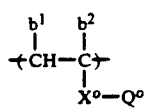

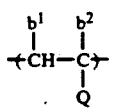

wherein $X^0$ has the same meaning as V in formula (I); $Q^0$ is an aliphatic group having from 1 to 22 carbon atoms or an aromatic group having from 6 to 12 carbon atoms; Q is

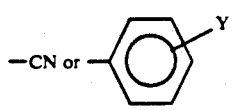

wherein Y is a hydrogen atom, a halogen atom, an alkoxy group, or —COO$Z^3$ (wherein $Z^3$ is an alkyl group, an aralkyl group, or an aryl group); and $b^1$ and $B^2$, which may be the same or different, have the same meanings as $a^1$ and $a^2$ in formula (I):

wherein $X^1$ has the same meaning as $X^0$ in formula (IIa); $Q^1$ has the same meaning as $Q^0$ in formula (IIa); and $d^1$ and $d^2$, which may be the same or different, have the same meanings as $a^1$ and $a^2$ in formula (I); with the proviso that, in the component of the macrometer (M) represented by formula (IIa) and in the component of the monomer represented by formula (III), at least one of $Q^0$ and $Q^1$ is an aliphatic group having from 8 to 22 carbon atoms.

2. A liquid developing agent for electrostatic photography, which contains one or more of a pigment or dye, a resin insoluble in or swellable with a carrier liquid and a pigment or dye as coated with the resin, and a dispersing agent and a charge-adjusting agent in a non-aqueous solvent carrier liquid having a dielectric constant of 3 or less and a volume specific resistance of $10^9$ Ωcm or more, wherein the dispersing agent comprises a graft copolymer, wherein monomer(s) to constitute the graft portion(s) of the graft copolymer is(are) at least one or more macromonomers each having a terminal polymerizable functional group, wherein the graft copolymer is substantially soluble in a non-aqueous solvent having a dielectric constant of 3 or less and a volume specific resistance of $10^9$ Ωcm or more, and wherein said graft copolymer is a copolymer comprising (1) at least a mono-functional macromonomer (M) having a weight average molecular weight of from $1 \times 10^3$ to $4 \times 10^4$, and (2) at least one monomer represented by formula (III), said monofunctional macromonomer (M) having a polymerizable double bond group represented by formula (I) bonded to only one terminal of a polymer main chain containing at least one kind of a polymer component represented by formula (IIa) or (IIb):

wherein V is

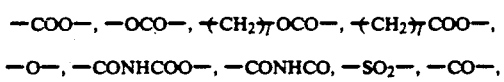

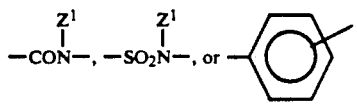

(wherein $Z^1$ is a hydrogen atom or a hydrocarbon group and l represents an integer of from 1 to 3); $a^1$ and $a^2$, which may be the same or different, each is a hydrogen atom, a halogen atom, a cyano group, a hydrocarbon group, —COO—$Z^2$, or —COO—$Z^2$ bonded via a hydrocarbon group (wherein $Z^2$ is a hydrogen atom or a hydrocarbon group which may be substituted:

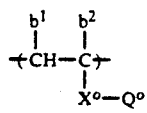  (IIa)

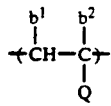  (IIb)

wherein $X^0$ has the same meaning as V in formula (I); $Q^0$ is an aliphatic group having from 1 to 22 carbon atoms or an aromatic group having from 6 to 12 carbon atoms; Q is

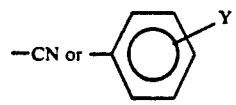

wherein Y is a hydrogen atom, a halogen atom, an alkoxy group, or —$COOZ^3$ (wherein $Z^3$ is an alkyl group, an aralkyl group, or an aryl group); and $b^1$ and $b^2$, which may be the same or different, have the same meanings as $a^1$ and $a^2$ in formula (I):

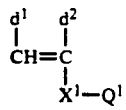  (III)

wherein $X^1$ has the same meaning as $X^0$ in formula (IIa); $Q^1$ has the same meaning as $Q^0$ in formula (IIa); and $d^1$ and $d^2$, which may be the same or different, have the same meanings as $a^1$ and $a^2$ in formula (I); with the proviso that, in the component of the macromonomer (M) represented by formula (IIa) and in the component of the monomer represented by formula (III), at least one of $Q^0$ and $Q^1$ is an aliphatic group having from 8 to 22 carbon atoms, and wherein said graft copolymer is a copolymer having a polar group selected from —$PO_3H_2$, —$SO_3H$, —COOH, —OH,

—P—$Z^0$ (wherein $Z^0$ is —$Z^{10}$ or —$OZ^{10}$ (wherein $Z^{10}$ is a hydrocarbon group)), a formyl group, and an amino group at one terminal of a polymer main chain.

3. A liquid developing agent to be employed in a method of forming printing plates where an electrostatic latent image as formed on the surface of a printing plate precursor comprising an electroconductive support and an electrophotographic light-sensitive layer as provided on the support is developed with a liquid developing agent and thereafter the non-image portions are dissolved to give a printing plate, the liquid developing agent containing at least a resin insoluble in or swellable with a carrier liquid and/or a dye or pigment as coated with the resin, and a dispersing agent and a charge-adjusting agent in a high electric-resistance non-aqueous solvent carrier liquid having a dielectric constant of 3 or less and a volume specific resistance of $10^9$ Ωcm or more, in which the dispersing agent comprises a graft copolymer, wherein monomer(s) to constitute the graft portion(s) of the graft copolymer is(are) at least one or more macromonomers each having a terminal polymerization functional group, wherein the graft copolymer is substantially soluble in a non-aqueous solvent having a dielectric constant of 3 or less and a volume specific resistance of $10^9$ Ωcm or more, and wherein said graft copolymer is a copolymer comprising (1) at least a mono-functional macromonomer (M) having a weight average molecular weight of from $1 \times 10^3$ to $4 \times 10^4$, and (2) at least one monomer represented by formula (III), said mono-functional macromonomer (M) having a polymerizable double bond group represented by formula (I) bonded to only one terminal of a polymer main chain containing at least one kind of a polymer component represented by formula (IIa) or (IIb):

  (I)

wherein V is

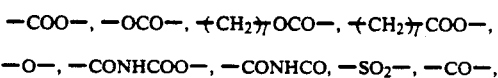

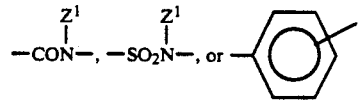

(wherein $Z^1$ is a hydrogen atom or a hydrocarbon group and l represents an integer of from 1 to 3); $a^1$ and $a^2$, which may be the same or different, each is a hydrogen atom, a halogen atom, a cyano group, a hydrocarbon group, —COO—$Z^2$, or —COO—$Z^2$ bonded via a hydrocarbon group (wherein $Z^2$ is a hydrogen atom or a hydrocarbon group which may be substituted:

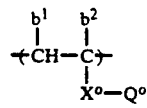  (IIa)

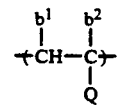  (IIb)

wherein $X^0$ has the same meaning as V in formula (I); $Q^0$ is an aliphatic group having from 1 to 12 carbon atoms or an aromatic group having from 6 to 12 carbon atoms, Q is

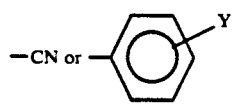

wherein Y is a hydrogen atom, a halogen atom, an alkoxy group, or —$COOZ^3$ (wherein $Z^3$ is an alkyl group, an aralkyl group, or an aryl group); and $b^1$ and $b^2$, which may be the same or different, have the same meanings as $a^1$ and $a^2$ in formula (I):

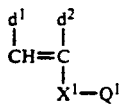  (III)

wherein $X^1$ has the same meaning as $X^0$ in formula (IIa); $Q^1$ has the same meaning as $Q^0$ in formula (IIa); and $d^1$ and $d^2$, which may be the same or different, have the same meanings as $a^1$ and $a^2$ in formula (I); with the proviso that, in the component of the macromonomer (M) represented by formula (IIa) and in the component of the monomer represented by formula (III), at least one of $Q^0$ and $Q^1$ is an aliphatic group having from 8 to 22 carbon atoms.

4. A liquid developing agent to be employed in a method of forming printing plates where an electrostatic latent image as formed on the surface of a printing plate precursor comprising an electroconductive support and an electrophotographic light-sensitive layer as provided on the support is developed with a liquid developing agent and thereafter the non-image portions are dissolved to give a printing plate, the liquid developing agent containing at least a resin insoluble in or swellable with a carrier liquid and/or a dye or pigment as coated with the resin, and a dispersing agent and a charge-adjusting agent in a high electric-resistance non-aqueous solvent carrier liquid having a dielectric constant of 3 or less and a volume specific resistance of $10^9$ $\Omega$cm or more, in which the dispersing agent comprises a graft copolymer, wherein monomer(s) to constitute the graft portion(s) of the graft copolymer is(are) at least one or more macromonomers each having a terminal polymerizable functional group and that the graft copolymer is substantially soluble in a non-aqueous solvent having a dielectric constant of 3 or less and a volume specific resistance of $10^9$ $\Omega$cm or more, and wherein said graft copolymer is a copolymer comprising (1) at lest a mono-functional macromonomer (M) having a weight average molecular weight of from $1 \times 10^3$ to $4 \times 10^4$, and (20 at least one monomer represented by formula (III), said mono-functional macromonomer (M) having a polymerizable double bond group represented by formula (I) bonded to only one terminal of a polymer main chain containing at least one kind of a polymer component represented by formula (IIa) or (IIb):

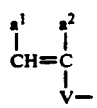  (I)

wherein V is

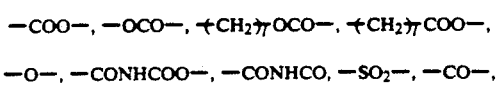

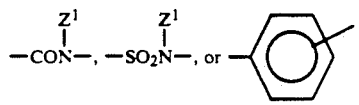

(wherein $Z^1$ is a hydrogen atom or a hydrocarbon group and l represents an integer of from 1 to 3); $a^1$ and $a^2$, which ma be the same or different, each is a hydrogen atom, a halogen atom, a cyano group, a hydrocarbon group, $-COO-Z^2$, or $-COO-Z^2$ bonded via a hydrocarbon group (wherein $Z^2$ is a hydrogen atom or a hydrocarbon group which may be substituted):

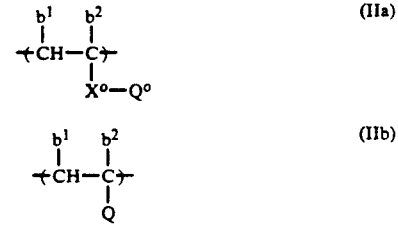

wherein $X^0$ has the same meaning as V in formula (I); $Q^0$ is an aliphatic group having from 1 to 22 carbon atoms or an aromatic group having from 6 to 12 carbon atoms; Q is

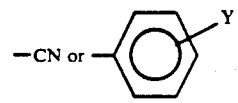

wherein Y is a hydrogen atom, a halogen atom, an alkoxy group, or $-COOZ^3$ (wherein $Z^3$ is an alkyl group, an aralkyl group, or an aryl group); and $b^1$ and $b^2$, which may be the same or different, have the same meanings as $a^1$ and $a^2$ in formula (I):

wherein $X^1$ has the same meaning as $X^0$ in formula (IIa); $Q^1$ has the same meaning as $Q^0$ in formula (IIa); and $d^1$ and $d^2$, which may be the same or different, have the same meanings as $a^1$ and $a^2$ in formula (I); with the proviso that, in the component of the macromonomer (M) represented by formula (IIa) and in the component of the monomer represented by formula (III), at least one of $Q^0$ and $Q^1$ is an aliphatic group having from 8 to 22 carbon atoms and wherein said graft copolymer is a copolymer having a polar group selected from $-PO_3H_2$, $-SO_3H$, $-COOH$, $-OH$,

$-P-Z^0$ (wherein $Z^0$ is $-Z^{10}$ or $-OZ^{10}$ (wherein $Z^{10}$ is a hydrocarbon group)), a formyl group, and an amino group at one terminal of a polymer main chain.

* * * * *